(12) United States Patent
Smith, Jr.

(10) Patent No.: US 7,503,742 B2
(45) Date of Patent: Mar. 17, 2009

(54) VEHICLE AND EQUIPMENT TRANSPORT VEHICLE

(75) Inventor: Raymond Smith, Jr., Lake Bluff, IL (US)

(73) Assignee: Up-N-Atom, LLC, Waukesha, WI (US)

( * ) Notice: Subject to any disclaimer, the term of this patent is extended or adjusted under 35 U.S.C. 154(b) by 0 days.

(21) Appl. No.: 11/451,025

(22) Filed: Jun. 12, 2006

(65) Prior Publication Data

US 2007/0147977 A1 Jun. 28, 2007

Related U.S. Application Data

(63) Continuation of application No. 10/751,177, filed on Jan. 2, 2004, now Pat. No. 7,063,494, which is a continuation-in-part of application No. 09/818,446, filed on Mar. 27, 2001, now Pat. No. 6,698,996.

(60) Provisional application No. 60/192,961, filed on Mar. 29, 2000.

(51) Int. Cl.
*B60P 1/34* (2006.01)
*B60P 1/43* (2006.01)

(52) U.S. Cl. ...................... 414/471; 414/537

(58) Field of Classification Search .............. 414/471, 414/481, 482, 483
See application file for complete search history.

(56) References Cited

U.S. PATENT DOCUMENTS

| | | | |
|---|---|---|---|
| 1,941,400 A | 12/1933 | Johnson | |
| 2,169,661 A | 8/1939 | Ratcliffe | |
| 2,703,658 A | 3/1955 | Bazzell | |
| 3,142,394 A | 7/1964 | Schwartz | |
| 3,305,114 A * | 2/1967 | Bellingher | 414/537 |
| 3,633,775 A | 1/1972 | Pugliese | |
| 3,647,097 A | 3/1972 | Skaggs | |
| 3,675,800 A | 7/1972 | Weyant et al. | |
| 3,740,090 A | 6/1973 | Lynde | |
| 3,870,170 A | 3/1975 | Noble et al. | |
| 3,931,895 A | 1/1976 | Grimaldo | |
| 3,968,892 A * | 7/1976 | Spors | 414/482 |
| 4,122,963 A | 10/1978 | Berglund et al. | |
| 4,133,440 A | 1/1979 | Heidrick, Jr. | |
| 4,260,315 A | 4/1981 | Bouffard | |
| 4,278,375 A * | 7/1981 | Drake et al. | 410/26 |
| 4,318,656 A | 3/1982 | Ezell | |
| 4,417,841 A | 11/1983 | Chadwick | |
| 4,456,420 A | 6/1984 | Newhard | |
| 4,630,991 A | 12/1986 | Landoll et al. | |
| 4,673,328 A | 6/1987 | Shiels | |
| 4,702,662 A | 10/1987 | Marlett | |

(Continued)

FOREIGN PATENT DOCUMENTS

AU 500244 7/1978

(Continued)

*Primary Examiner*—James Keenan
(74) *Attorney, Agent, or Firm*—Boyle Fredrickson, S.C.

(57) ABSTRACT

The present invention is directed to a specialized truck bed wherein the bed is divided into two areas or deck sections connected by a transverse hinge. The invention is also directed to a winch system for use on a vehicle. The invention is further directed to an improved locking post or post assembly for use with the specialized truck bed of the present invention.

29 Claims, 24 Drawing Sheets

U.S. PATENT DOCUMENTS

| | | | |
|---|---|---|---|
| 4,749,317 A * | 6/1988 | Daniel | 410/26 |
| RE32,736 E | 8/1988 | Lovell | |
| 4,770,592 A | 9/1988 | Winter | |
| 4,784,545 A * | 11/1988 | Lawrence | 410/26 |
| 4,795,303 A * | 1/1989 | Bubik | 414/478 |
| 4,842,470 A | 6/1989 | Hubbard | |
| 5,000,645 A | 3/1991 | Polojarvi | |
| 5,051,053 A | 9/1991 | Groeneweg | |
| 5,203,667 A | 4/1993 | Yoneda et al. | |
| 5,234,308 A | 8/1993 | Mann | |
| 5,257,894 A | 11/1993 | Grant | |
| 5,263,807 A | 11/1993 | Pijanowski | |
| 5,288,197 A | 2/1994 | Harris | |
| 5,326,215 A | 7/1994 | Eberhardt | |
| 5,362,195 A * | 11/1994 | Wagner | 414/483 |
| 5,388,949 A | 2/1995 | Berg | |
| 5,458,451 A | 10/1995 | Bratlie et al. | |
| 5,509,639 A | 4/1996 | Ellis | |
| 5,511,929 A | 4/1996 | Loftus | |
| 5,662,453 A | 9/1997 | Gerstner et al. | |
| 5,688,099 A | 11/1997 | Fischer | |
| 5,816,767 A | 10/1998 | Mann | |
| 5,853,280 A | 12/1998 | Lohr | |
| 5,887,880 A | 3/1999 | Mullican et al. | |
| 5,921,742 A * | 7/1999 | Gearhart | 414/480 |
| 5,924,836 A | 7/1999 | Kelly | |
| 6,139,249 A * | 10/2000 | Lucht | 414/537 |
| 6,149,369 A * | 11/2000 | Reed | 414/480 |
| 6,186,596 B1 | 2/2001 | Jones | |
| 6,276,890 B1 | 8/2001 | Pratt | |
| 6,698,996 B2 | 3/2004 | Smith, Jr. | |
| 7,063,494 B2 | 6/2006 | Smith, Jr. | |
| 2002/0081182 A1 | 6/2002 | Harris | |
| 2002/0164239 A1 | 11/2002 | Angermeier | |
| 2004/0247419 A1 | 12/2004 | Hill | |
| 2006/0099061 A1 | 5/2006 | Smith, Jr. et al. | |

FOREIGN PATENT DOCUMENTS

| | | |
|---|---|---|
| AU | 51796/79 | 10/1979 |
| CH | 540133 | 9/1973 |
| DE | 1962783 | 6/1971 |
| DE | 3930024 | 3/1991 |
| EP | 0068772 | 1/1983 |
| FR | 2126627 | 10/1972 |
| FR | 2297152 | 8/1976 |
| FR | 2437956 | 4/1980 |
| FR | 2491014 | 4/1982 |
| FR | 2510954 | 2/1983 |
| GB | 1011789 | 9/1964 |
| WO | WO 91/03389 | 3/1991 |

* cited by examiner

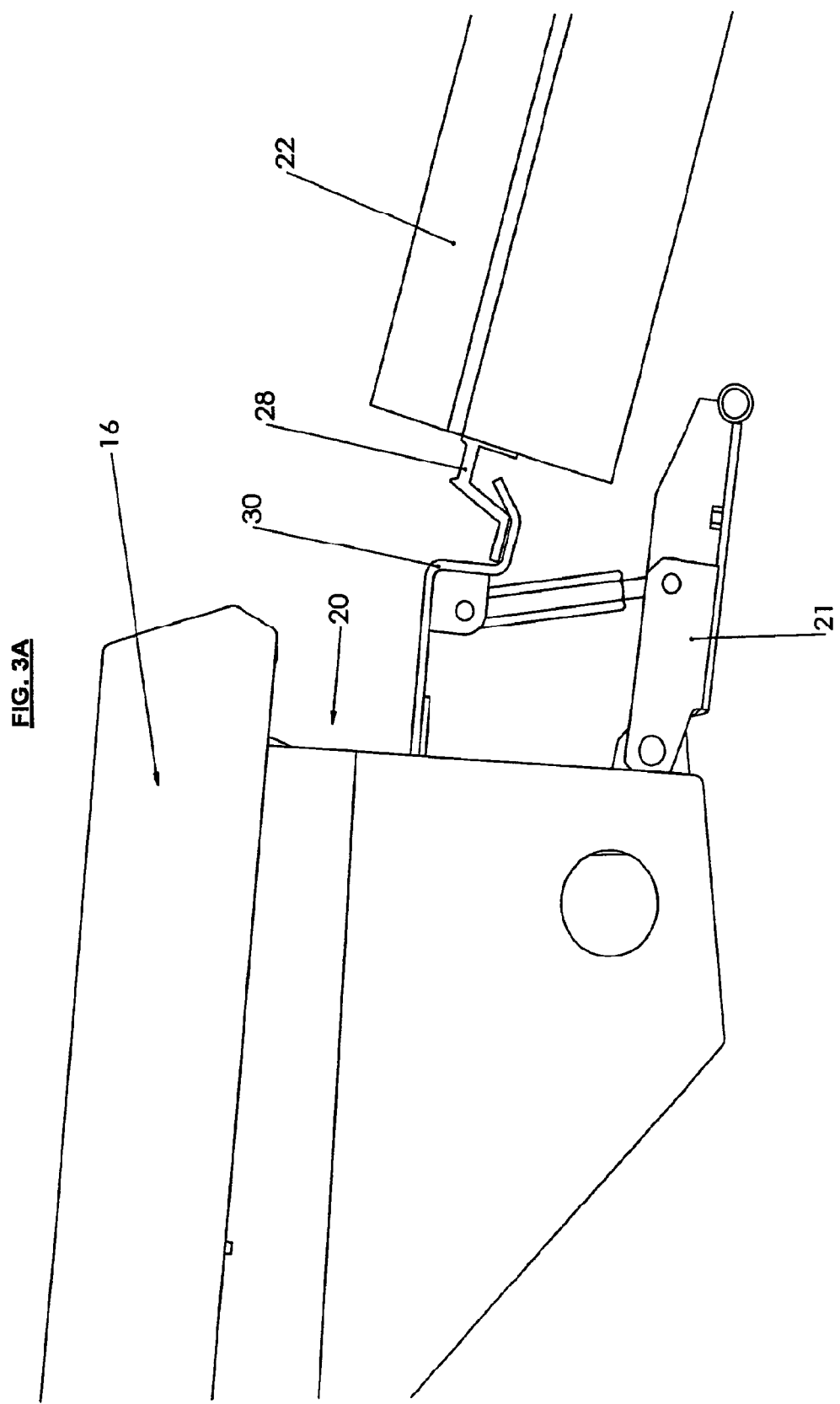

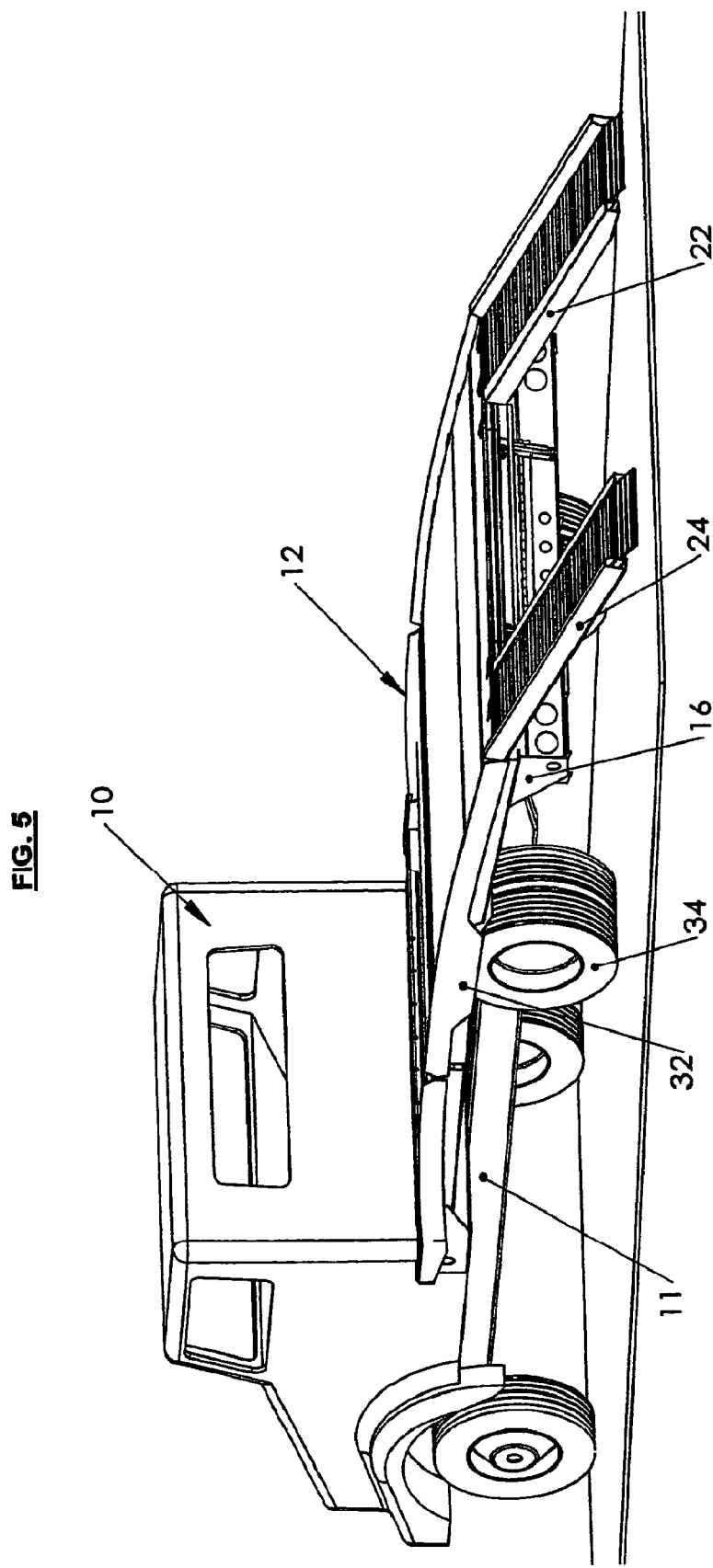

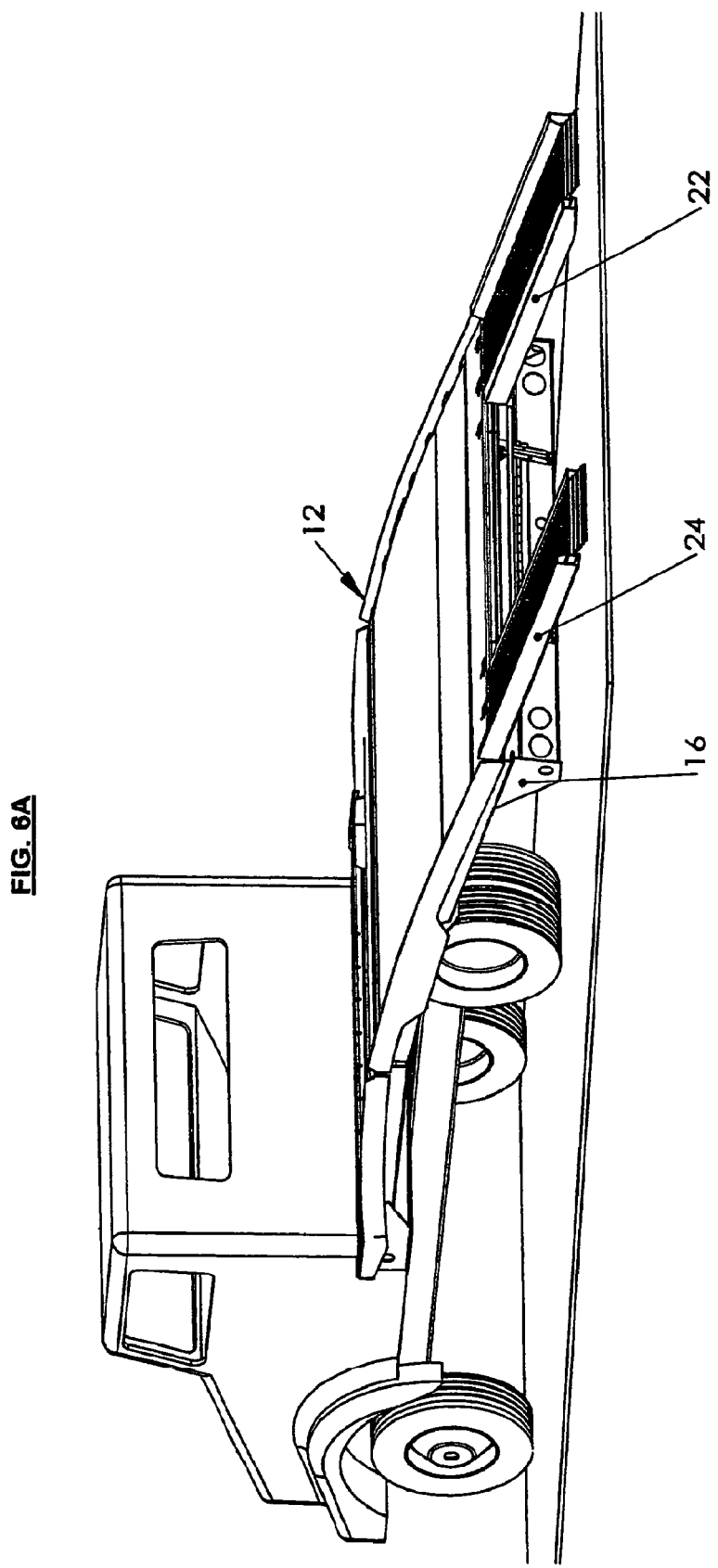

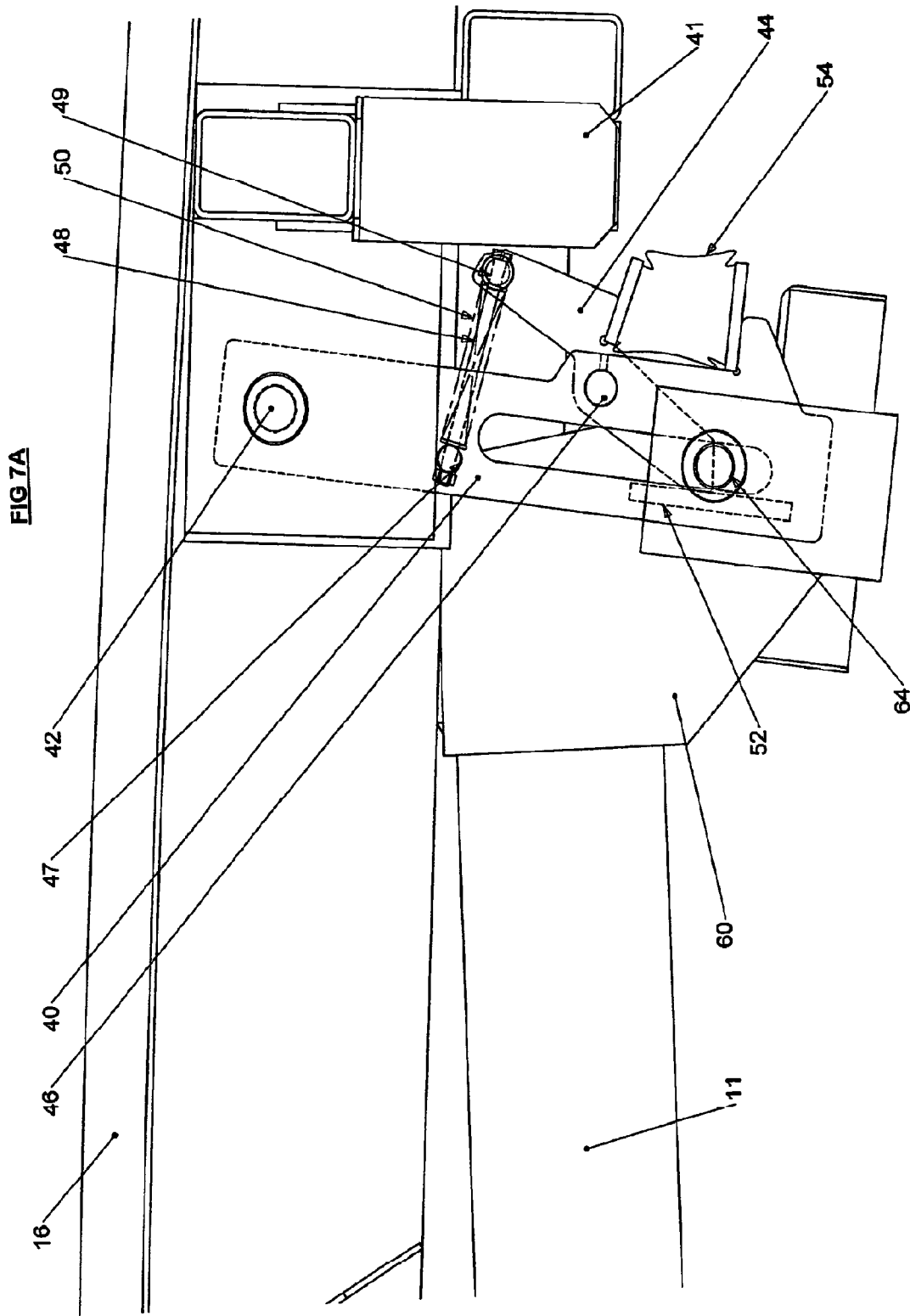

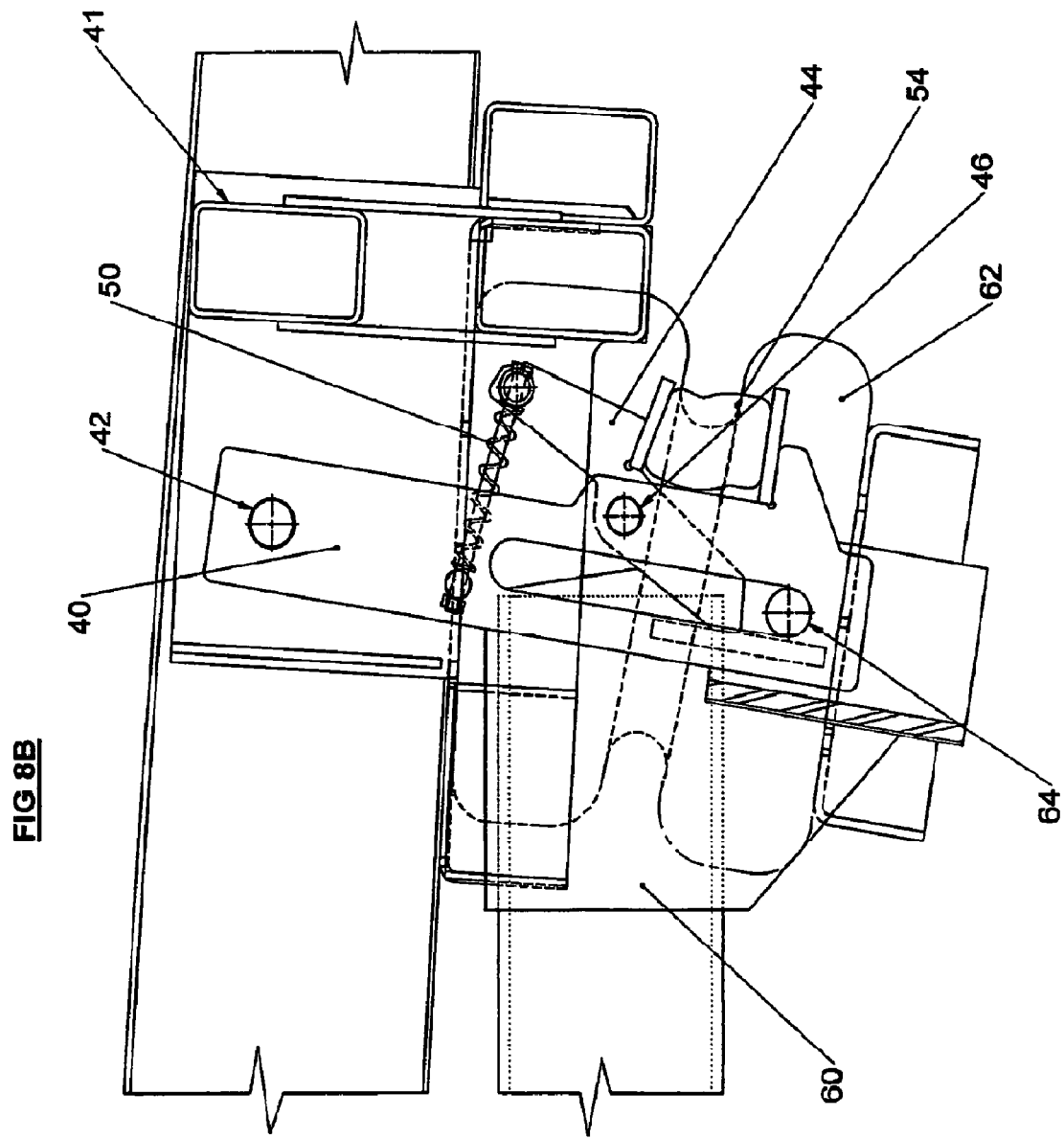

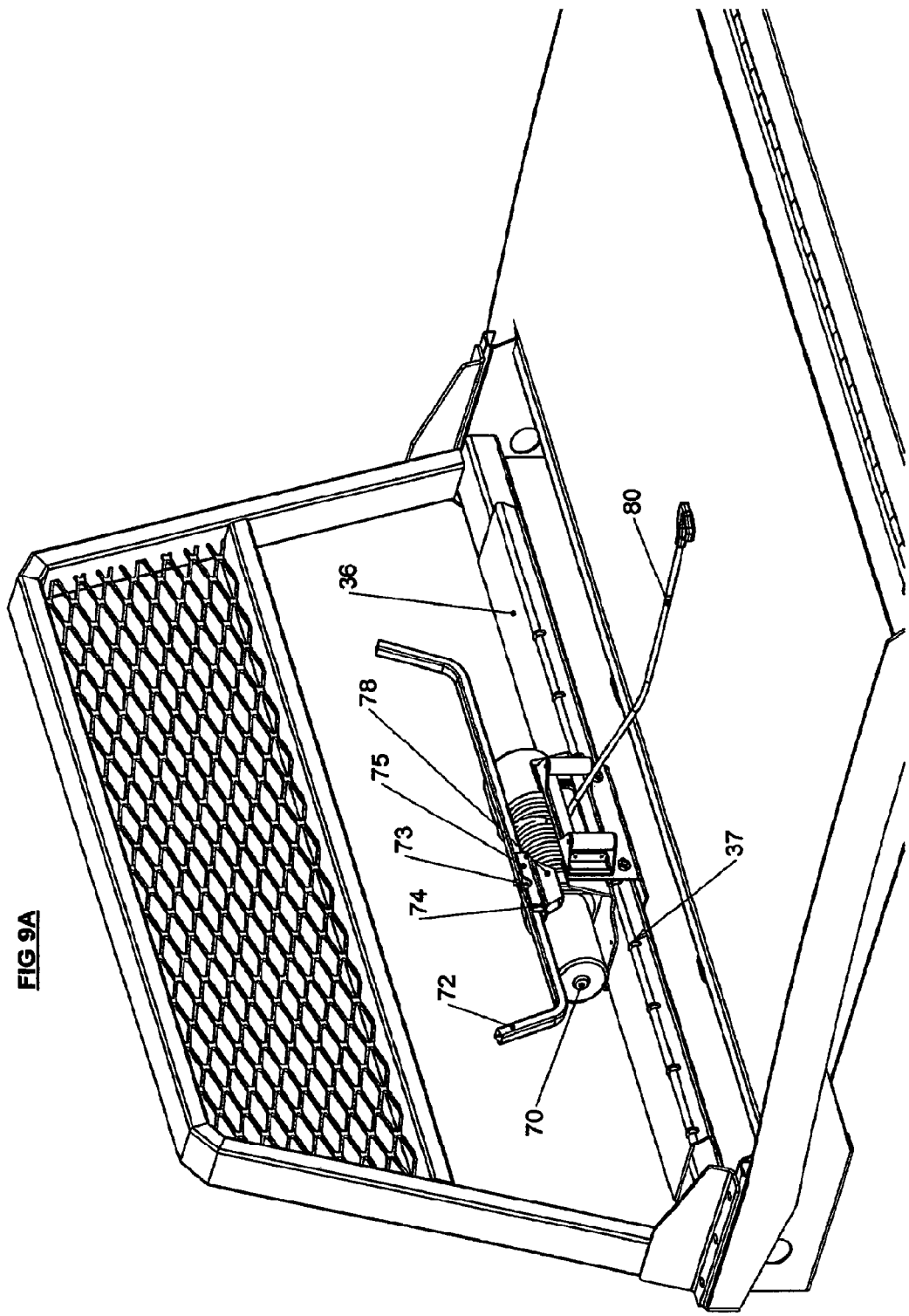

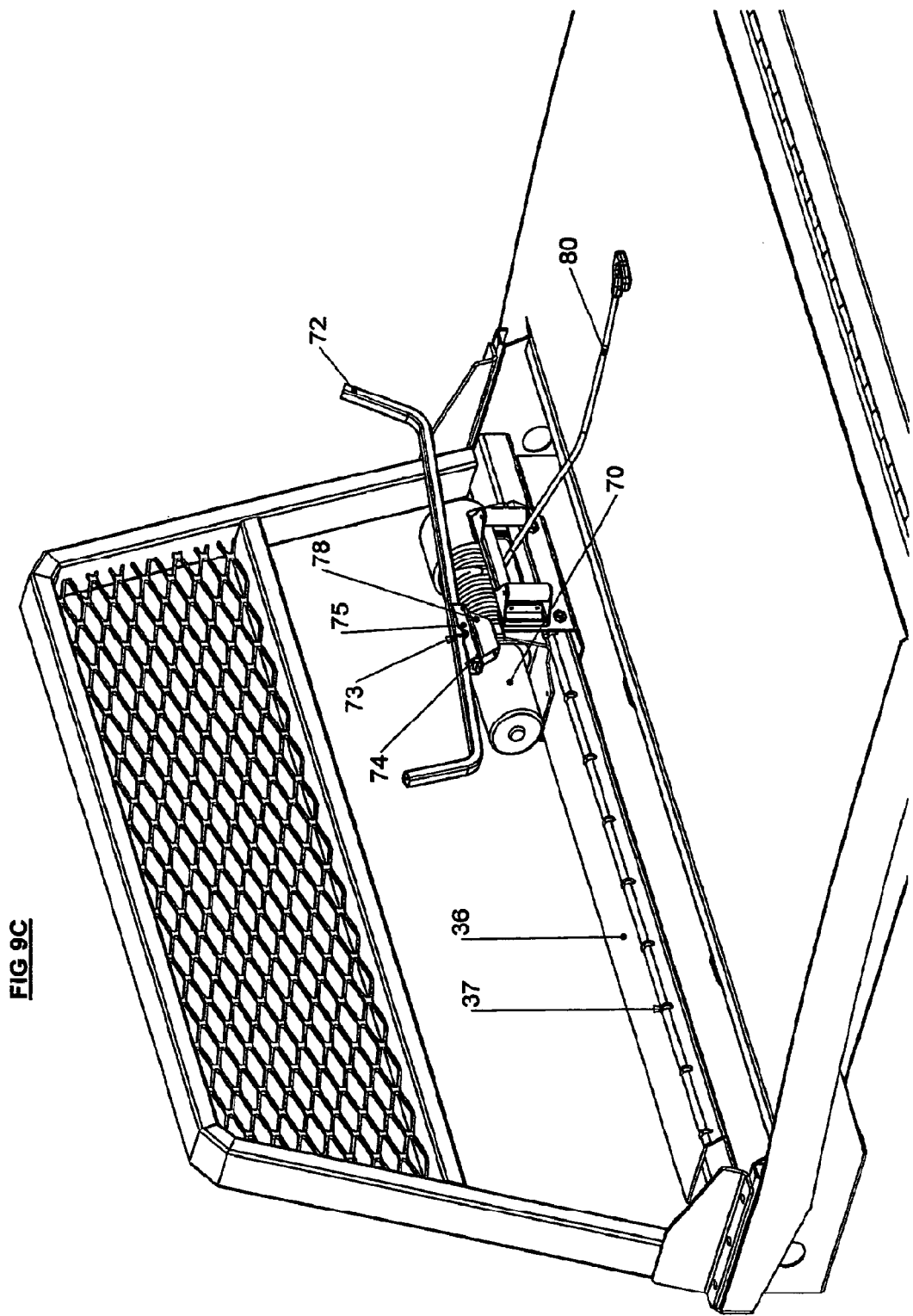

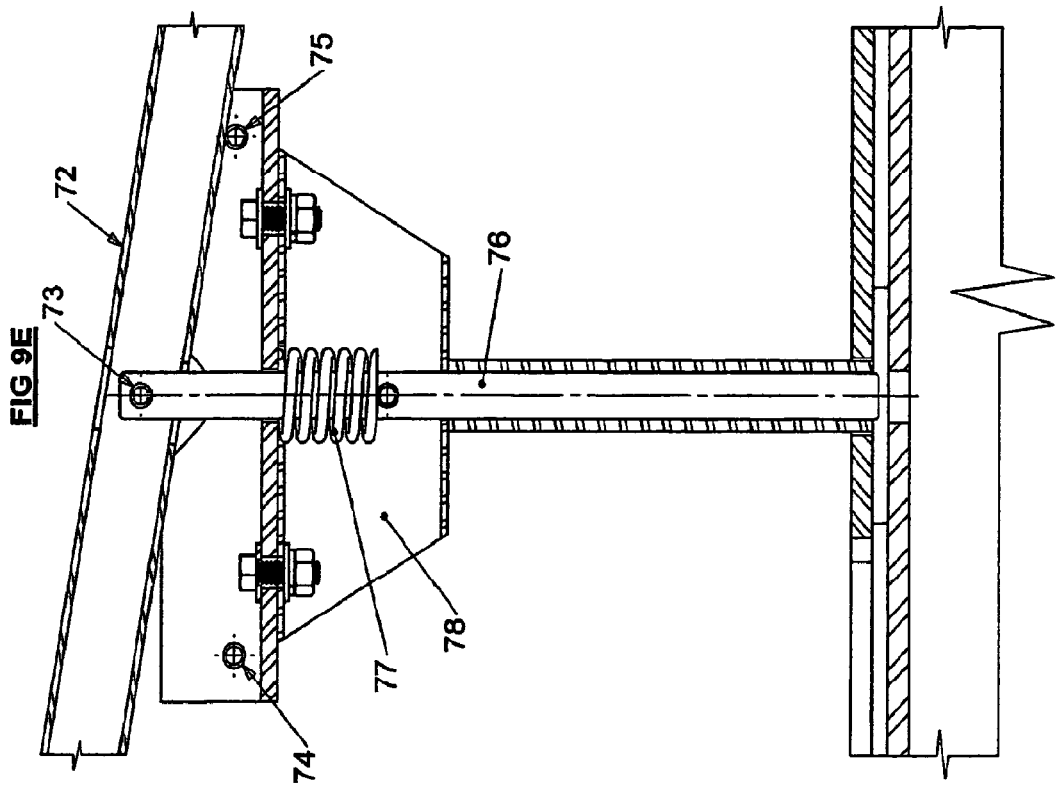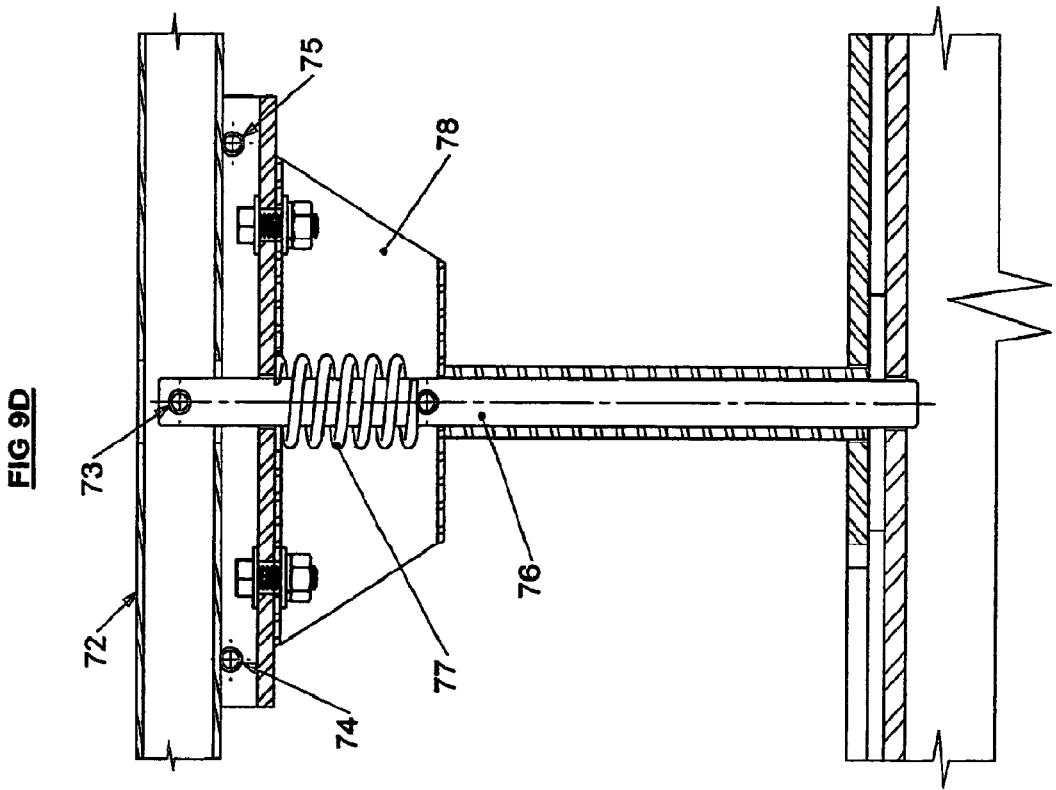

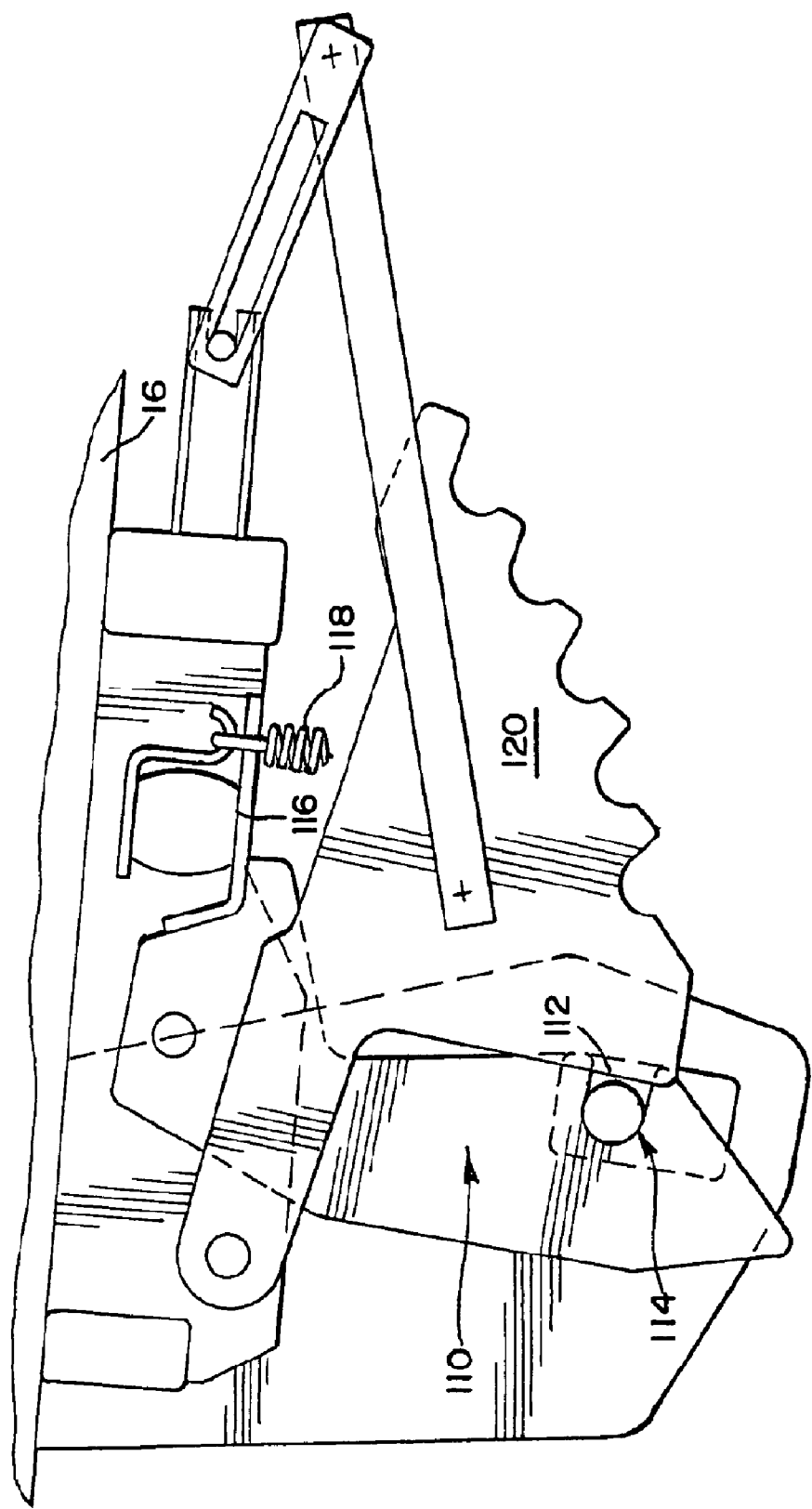

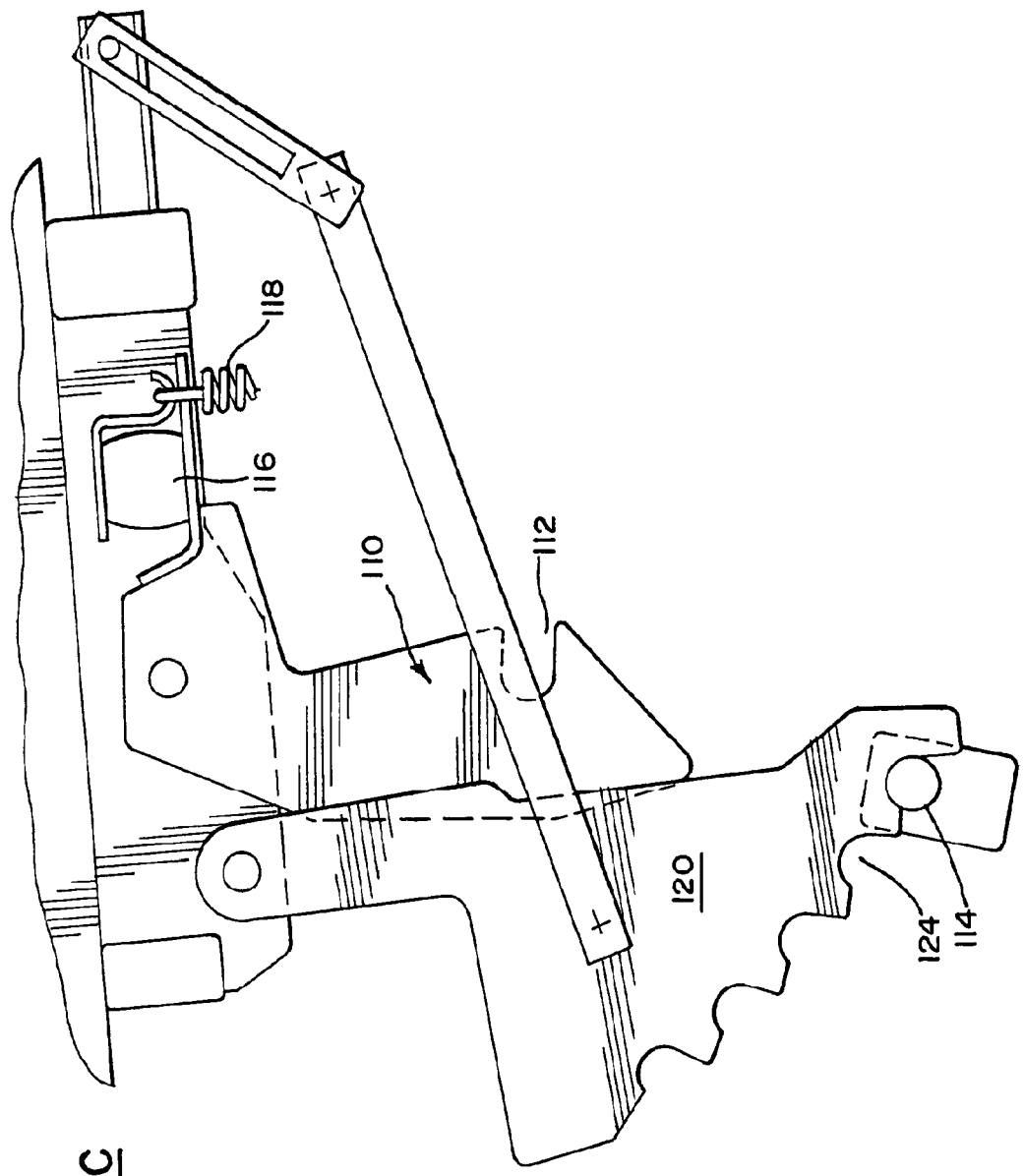

VEHICLE AND EQUIPMENT TRANSPORT VEHICLE

CROSS REFERENCE TO RELATED APPLICATIONS

This application is a continuation of U.S. application Ser. No. 10/751,177, filed Jan. 2, 2004, which issued Jun. 20, 2006 as U.S. Pat. No. 7,063,494, which is a continuation-in-part of U.S. Applicaton Ser. No. 09/818,446, filed Mar. 27, 2001, which issued Mar. 2, 2004 as U.S. Pat. No. 6,698,996, which claims priority in U.S. Provisional Appln. No. 60/192,961, filed Mar. 29, 2000, now expired, the entirety of each of which is hereby expressly incorporated herein by reference.

BACKGROUND OF THE INVENTION

The present invention relates to truck beds for automobile and equipment delivery, and more specifically to a truck bed which is divided into two areas and connected by a hinge. Even more specifically, the present invention is directed to such a truck bed with an improved post assembly or locking post design.

Distributors of construction related rental equipment are daily confronted with the task of reducing the cost of single unit equipment delivery to the end user. Many are forced to use large tractors and trailers or heavy duty trucks equipped with roll back beds, which have been purchased to haul the bulkiest equipment in their rental fleets, for delivery of very small units. This has made the single delivery of a small unit very costly to the distributor since he cannot pass on the full expense to his customer. To reduce costs, the distributor will sometimes load a large trailer with a number of pieces of equipment, each destined for delivery to a different site. By following this practice, only one customer will receive his order in a timely fashion. The rest will have to wait.

An alternative method requires that the distributor own one or several small trailers towed by heavy duty pick-up trucks to make these deliveries. Even a small truck-trailer combination is quite long and difficult to maneuver for all but a skilled operator, especially in crowded city traffic. Delivery on muddy construction sites with such truck-trailer combinations is extremely difficult, especially when backing up to a drop off site is required.

The present invention is intended to overcome these shortcomings.

SUMMARY OF THE INVENTION

The present invention is directed to a specialized truck bed wherein the bed is divided into two areas or decks connected by a transverse hinge.

In one embodiment of the present invention, each deck section of the bed is constructed in an arch. The result is a light weight bed of great strength without need for a number of heavy gauge cross pieces as is typical in conventional flat bed design. An additional benefit of this design is that the resultant lowered center of gravity of both the bed and the load provides improved handling and a sense of greater stability for the driver.

In another embodiment, when in the travel position, the arch of the rear deck is slightly higher than that of the front. The benefit of this feature is that no significant hump occurs at the hinge line when the rear deck is lowered for ground loading and unloading. This allows very easy loading of any equipment with low ground clearance without fear of bottoming out on the hinge when crossing from the rear to the front portion of the deck.

In another embodiment, the rear deck-ramp combination of the present invention creates a very gentle grade, low enough to allow most powered equipment to readily climb onto the deck without assistance from a winch, thus reducing the cost of loading by saving time and labor.

In still yet another embodiment, the front deck portion is firmly fixed to the truck frame with conventional "U" bolts and shear plates. In the travel position, the hinge mounted rear deck is carried on two posts whose top ends are mounted to the deck frame while the slotted bottom end rests in truck frame mounted pins. The rear deck can be moved through an arc by a frame mounted elevating device such as an air or hydraulic cylinder, or by a powered screw. Ideally, the elevating device does not carry any load while the bed is in the travel position. This movement allows the rear deck to be raised for loading and unloading to an elevated dock, or lowered for loading and unloading directly to the ground. The rear deck also has a storage apparatus for ramps. These are used as a length addition to the lowered rear deck for ground loading and unloading. The rear deck-ramp combination creates a very gentle grade, low enough to allow most powered equipment to readily climb onto the deck without assistance from a winch, thus saving labor and time in loading the truck bed.

In a further embodiment, the truck bed has a winch which can be fitted to a cross tube assembly at the front of the deck. This tube assembly has a number of equally spaced slots along its front edge to engage a shot pin on the winch carrier for locking the winch against sideways movement when it is being used to assist in loading. This locking feature is especially beneficial when loading narrow equipment where two or more can be loaded side by side. In those cases, the movable winch can be positioned so that its cable will pull each piece of equipment onto the deck in a straight line. The present invention also encompasses this winch in other types of truck beds.

In still a further embodiment, the bed is fitted with numerous chain hold down points across the front and back, and along both sides.

In yet another embodiment of the present invention, the truck bed of the present invention has an improved and simplified post assembly or locking post design. This improved post assembly reduces the cost of the post assembly in the embodiments described above. In a further embodiment, the post assembly is provided with a notched dock lock to support the rear deck of the truck bed at a height convenient for loading or unloading equipment from a commercial truck dock.

BRIEF DESCRIPTION OF THE DRAWINGS

In describing the preferred embodiments, reference is made to the accompanying drawings wherein:

FIG. 3A shows the lip of the door to the storage area of the rear bed portion of the truck bed supporting a hook end of a ramp.

FIG. 5 shows the truck bed and ramp combination of the present invention with the truck bed partially lowered where, for example, it is mounted to a truck with a voided air suspension.

FIG. 6A shows the rear portion of the truck bed further lowered around its central hinge to a preferred loading position.

FIG. 7A shows the post assembly of FIG. 7 in greater detail.

FIGS. 8A-8D show in detail each of the elements of the two-post assembly and an elevating mechanism of an embodiment of the present invention in a step by step sequence.

FIG. 9A shows a winch carrier and winch of an embodiment of the present invention in the middle of the truck bed.

FIG. 9C shows the winch carrier and winch on the right side of the truck bed.

FIG. 9D shows a cross section of the winch carrier in the locked position.

FIG. 9E shows a cross section of the winch carrier in the unlocked position.

FIG. 10A shows the improved post assembly and dock lock in a travel position.

FIG. 10C shows the post assembly and dock lock of FIG. 10A with the truck deck in an elevated position ready for loading or unloading from a commercial truck dock.

DETAILED DESCRIPTION OF THE PRESENTLY PREFERRED EMBODIMENTS

Figure 1:
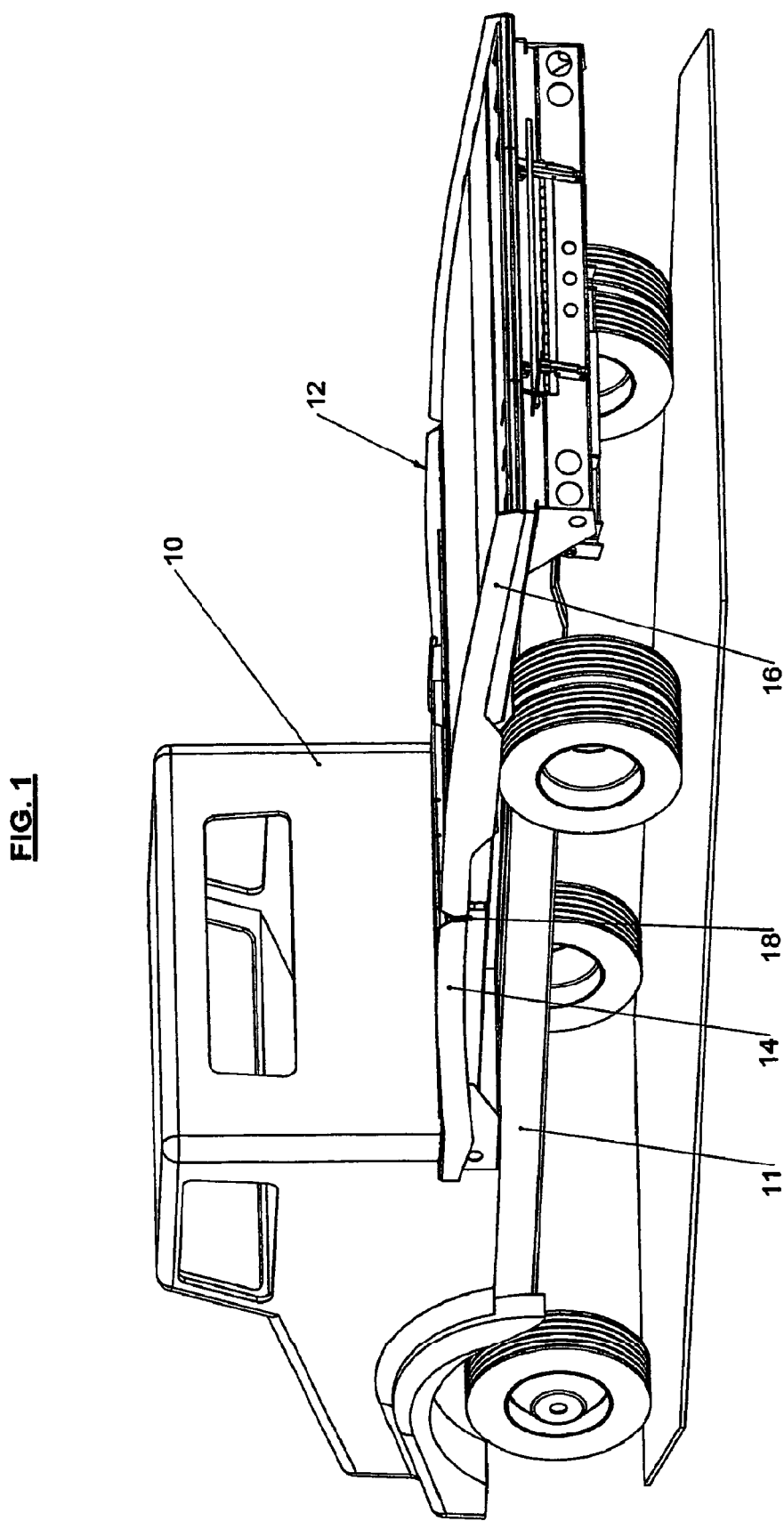
FIG. 1 shows an unloaded truck with the truck bed of the present invention in a travel position.

In the accompanying drawings, FIG. 1 shows an unloaded truck 10 with a truck frame 11 and a truck bed 12 of the present invention in a travel position. The truck bed 12 has a front deck portion 14 and a rear deck portion 16. In a preferred embodiment, the front deck portion 14 and the rear deck portion 16 are each constructed in the form of an arch, as shown in FIGS. 1, 2, 4, 5, 6 and 7. In a further preferred embodiment, when in the travel position, the arch of the rear deck portion 16 is slightly higher than that of the front bed portion 14. A transverse hinge 18 preferably connects the front deck portion 14 and the rear bed portion 16.

Preferably, the front deck portion 14 is firmly fixed to the truck frame 11. This connection can be made with, but is not limited to, "U" bolts and shear plates. In the travel position, the hinge mounted rear deck 16 is preferably carried on a two-post assembly 40 whose top ends are pinned to cross beam assembly 41 at 42. The closed latch 44 of the two-post assembly 40 rest on pin 64 in a frame mounted cross beam 60 shown in FIG. 7 and detailed in FIGS. 7A-7D and 8A-8D.

Figure 6B:
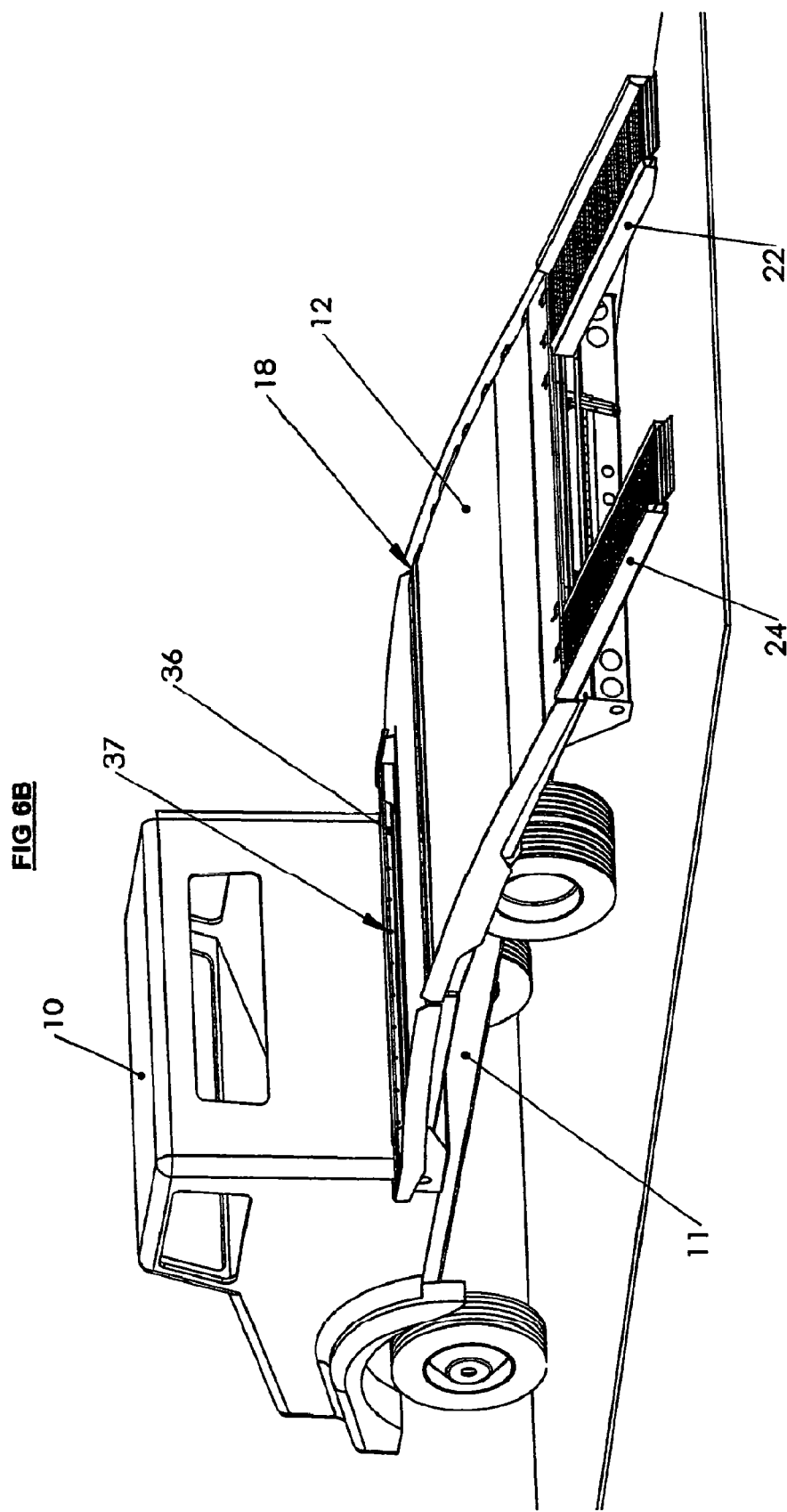
FIG. 6B shows a higher perspective view of the truck bed at FIG. 6A.

As shown in FIGS. 6A and 6B, the rear deck 16 can be moved through an arc about transverse hinge 18 by a frame mounted elevating device, such as, for example but not limited to, an air bag 62 or a hydraulic cylinder or powered screw. Preferably, the elevating device will not carry a load while the bed 12 is in the travel position. This is accomplished by carrying the load on the two-post assembly 40. The arc movement allows the rear portion 16 of the bed 12 to be either (1) raised for loading and unloading to an elevated dock, or (2) lowered for loading and unloading directly to the ground as shown in FIGS. 6A and 6B.

The bed is fitted with numerous chain hold-down points across the front and back, and along both sides. An optional winch (as shown in FIGS. 9A-9E) can be fitted to the cross tube assembly (shown in FIG. 6B) at the front of the deck to assist the loading of equipment which is either unpowered or without sufficient power to climb the ramps. Preferably, the tube assembly has a number of equally spaced slots 37 along its front edge to engage a shot pin on the winch carrier for locking the winch against sideways movement when it is being used to assist in loading. This locking feature is useful when loading narrow equipment so that two or more can be loaded side by side. In those cases, the movable winch can be positioned so that it can pull each piece of equipment in a straight line. The winch can also be used with standard truck beds or in other vehicles.

Figure 2:
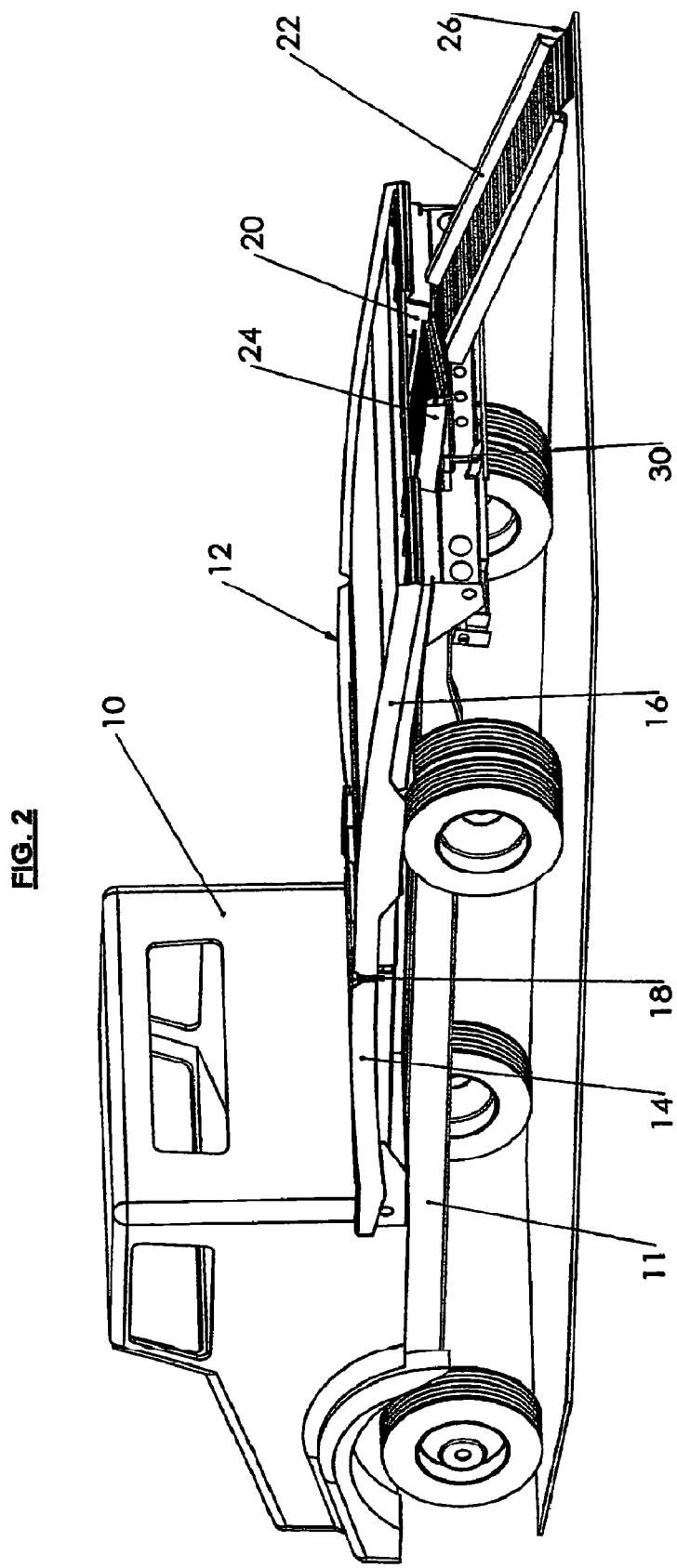
FIG. 2 shows ramps lowered to the ground from the storage area in the rear bed portion of the truck bed of the present invention.

In another embodiment of the present invention, the rear deck 16 has a storage area 20 for storing or holding ramps. These ramps are used as a length addition to the lowered bed for ground loading and unloading. FIG. 2 shows a ramp access door 30 open with one ramp 22 out and lowered to the ground, and another ramp 24 partially removed. The ramps 22 and 24 and the deck 16 are joined when the ramp access door 30 is closed so that the ramps are locked against accidental removal, yet are free to be adjusted sideways to accommodate varying wheel widths (see FIGS. 4, 5, 6A and 6B).

Figure 3B:
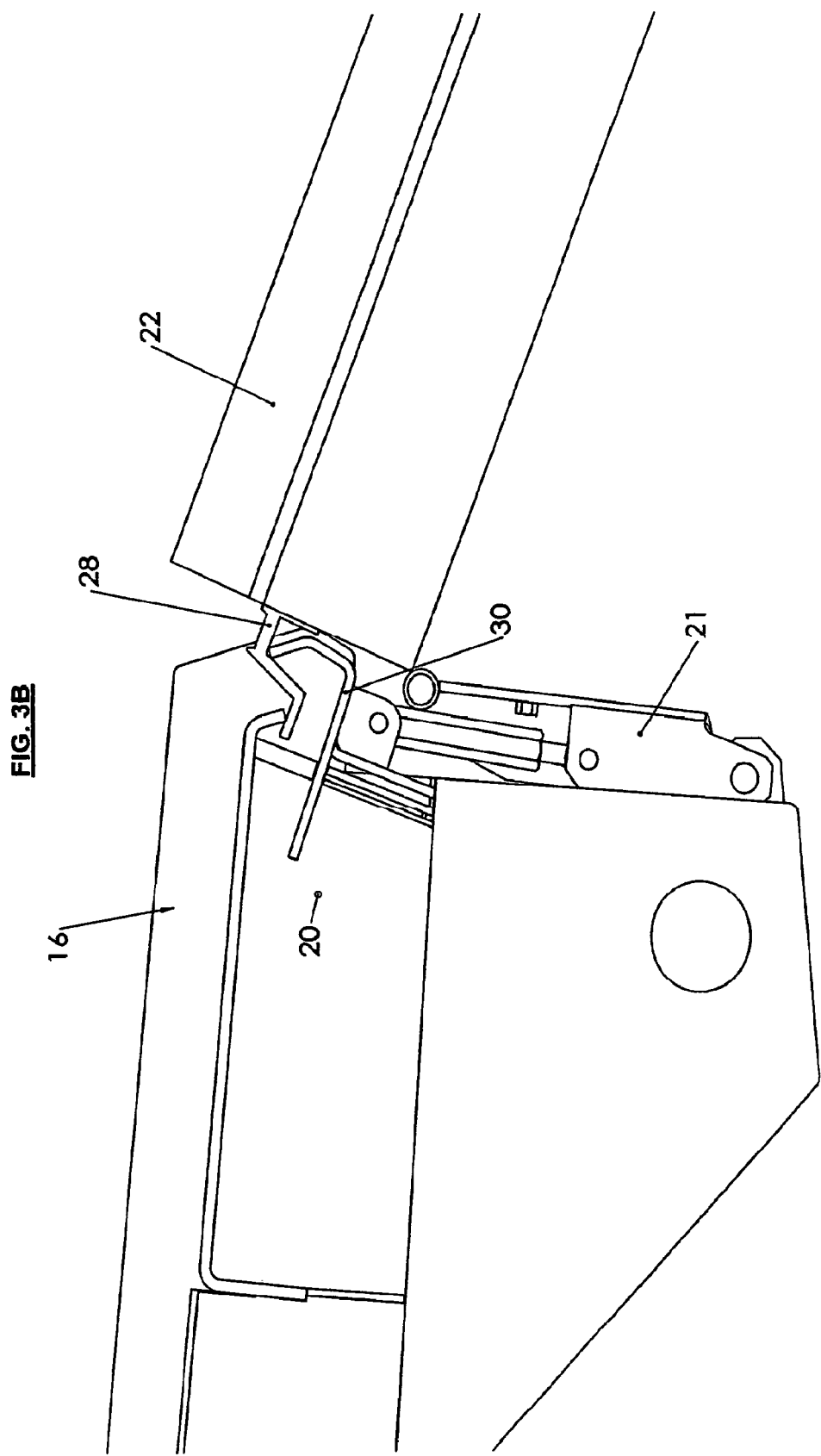
FIG. 3B shows the access door of the rear bed portion of the truck bed closed and securely locking the hook end of the ramp against removal or disengagement during loading.
Figure 4:
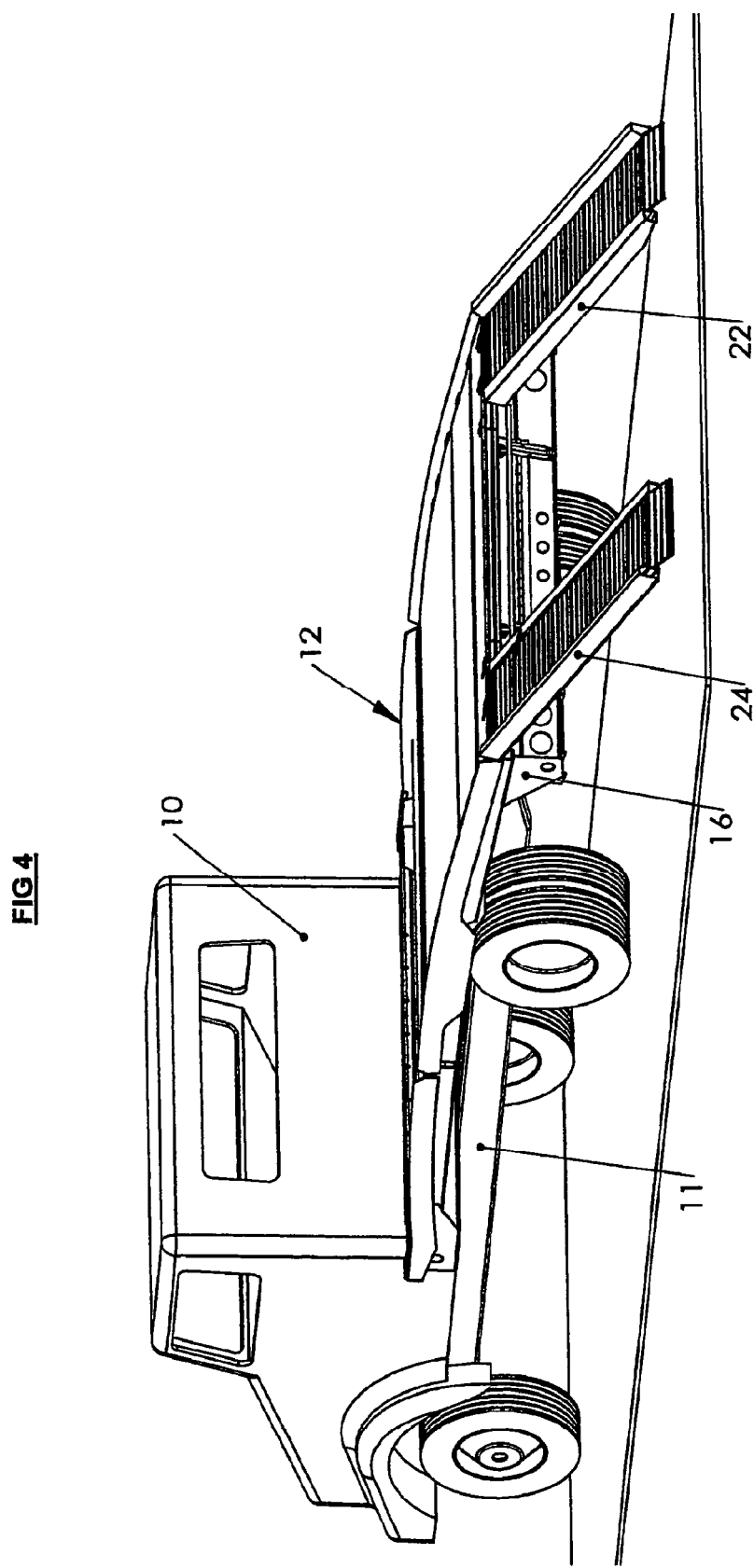
FIG. 4 shows the ramps positioned laterally from a central storage position and being securely locked and ready for loading.

In another embodiment, the free end 26 of the ramp 22 can be grasped and pulled completely from the storage area 20 until the upper hooked end 28 of the ramp stops automatically against an upturned lip of access door 30, as shown in FIG. 3A. The free end is then lowered to the ground. When the ramps have been extracted, the access door 30 is closed by the latching mechanism 21. This effectively locks the ramps to the rear of the truck bed preventing accidental removal, yet allows them to be freely positioned laterally to accommodate varying wheel widths of the equipment that will be loaded. Preferably, the ramps are removed from their storage area 20 prior to fully lowering the rear deck 16 to the desired loading position as shown in FIGS. 6A and 6B. This is advantageous so as to provide room for the rear end of the truck frame 11, which will occupy part of the ramp storage area 20.

In another preferred embodiment of the present invention, the truck bed 12 is mounted on a truck 10 equipped with a rear axle air suspension. FIG. 5 shows the truck bed-ramp 32 combination in a partially lowered position wherein the air bags of the suspension have been vented, thus lowering the frame 11 at the rear axle approximately 4 to 5 inches.

FIG. 6A shows an embodiment of the truck bed 12-ramp 22 combination in a position to load equipment. In this drawing, the rear deck 16 has been lowered to a solid stop when the preferred air bag 62 of the frame mounted elevating apparatus has been vented. FIG. 6B shows the same view as FIG. 6A, but from a slightly higher perspective so that the transverse hinge 18 across the center of the bed 12 and the notched front cross tube 36 and the notches 37 are clearly shown.

In another embodiment of the present invention, the rear portion of the truck bed 16 is held in the travel position by a two-post assembly 40 whose top ends are pinned to the deck cross beam 41 at 42, while the closed latch 44 rest on pin 64 in a truck frame cross beam 60.

Figure 7:
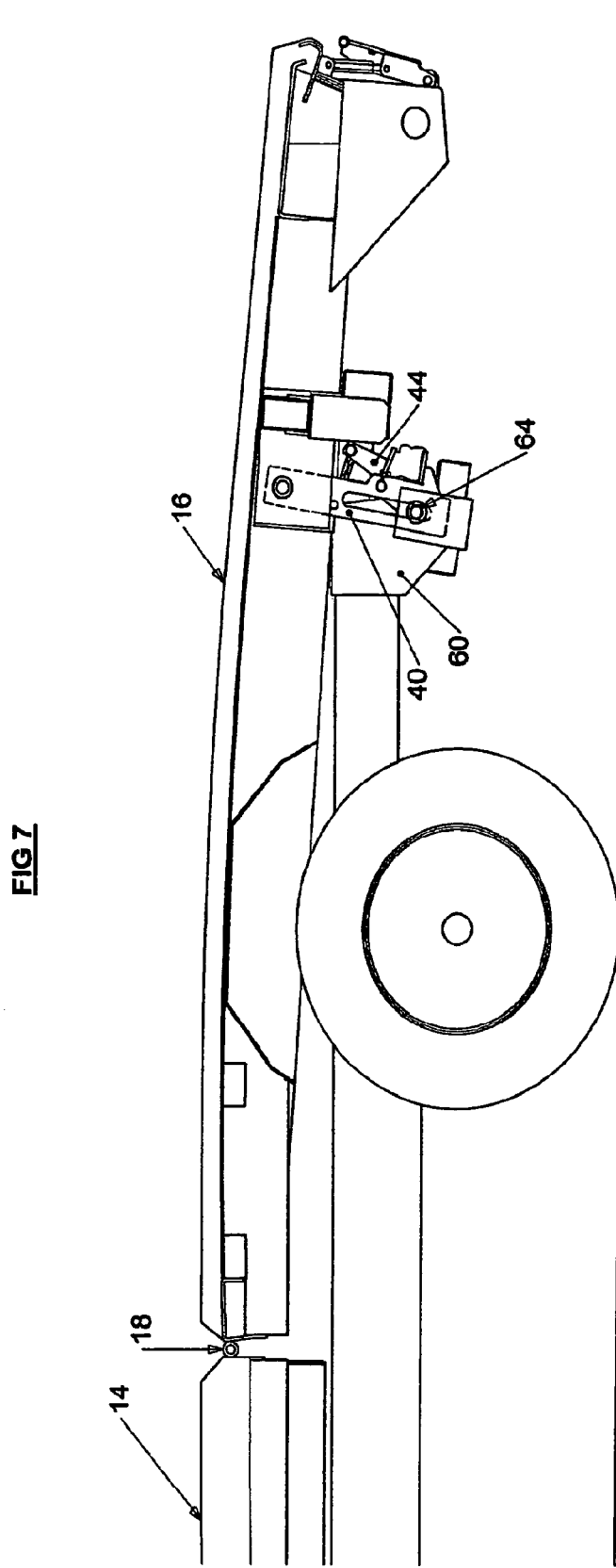
FIG. 7 shows the rear portion of the truck bed in its travel position supported on a two-post assembly.
Figure 7B:
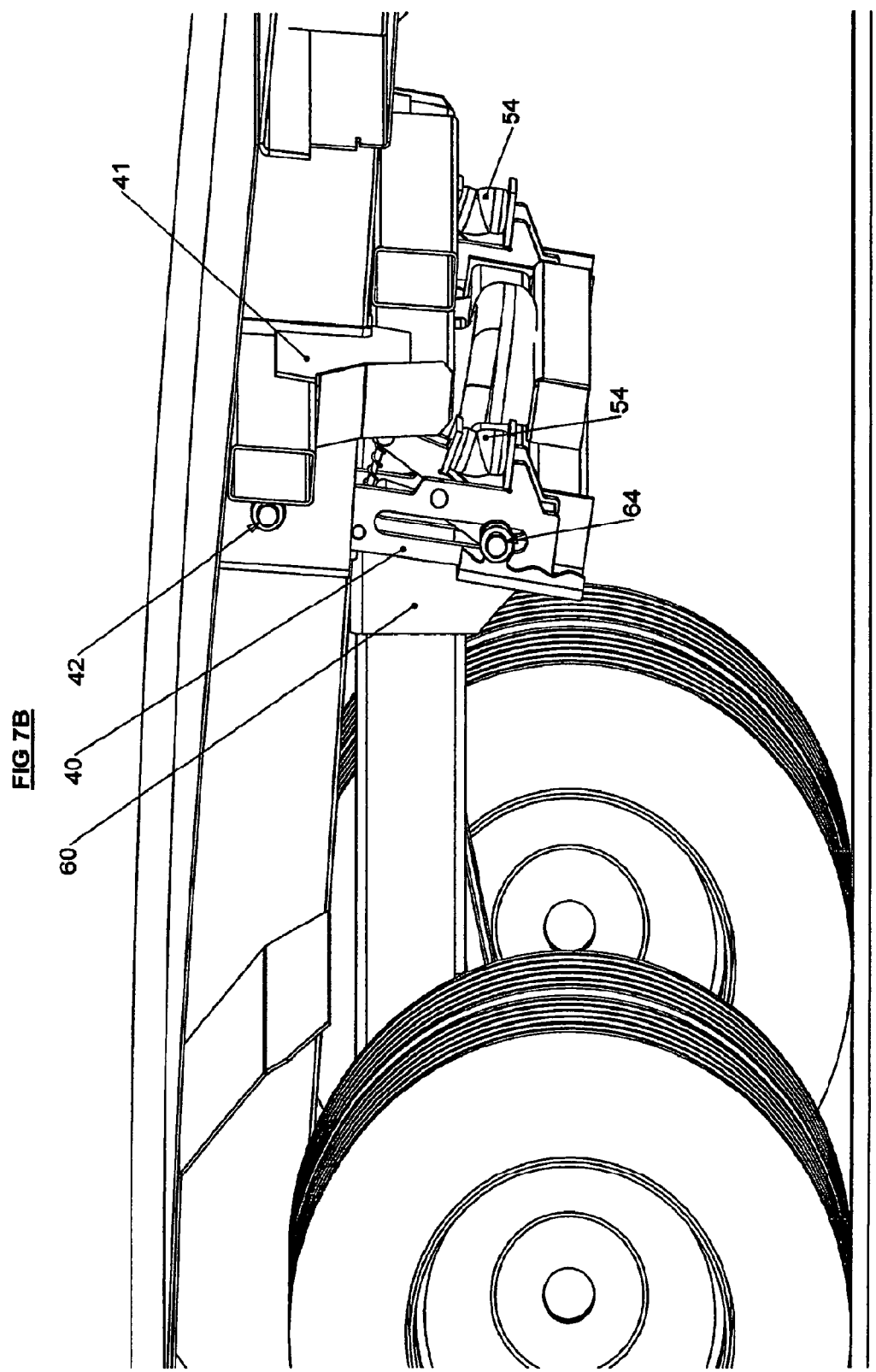
FIG. 7B shows an oblique view of the truck bed in its travel position supported on the two-post assembly.
Figure 7C:
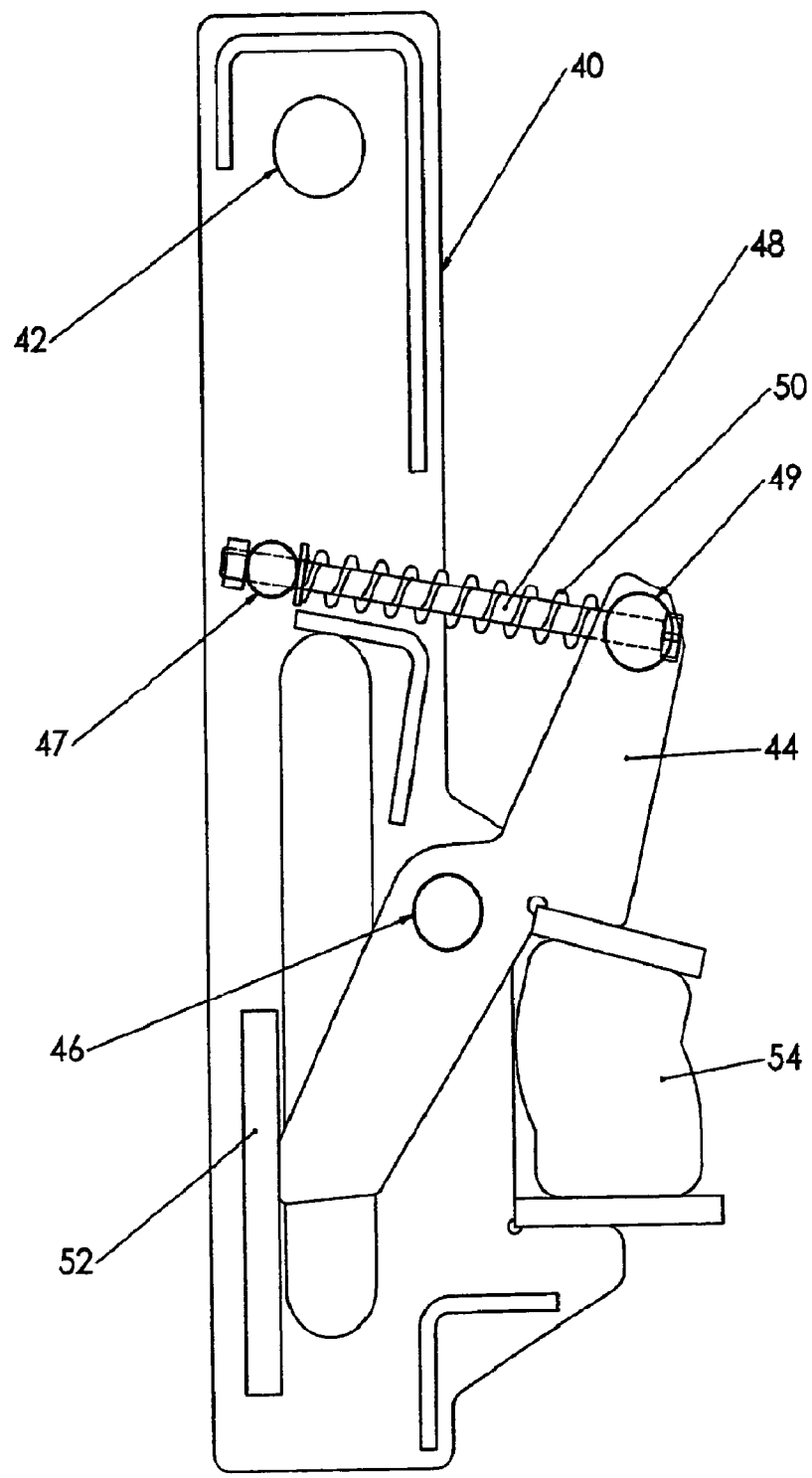
FIG. 7C and 7D shows the latch of the post assembly in the closed and open positions.
Figure 7D:
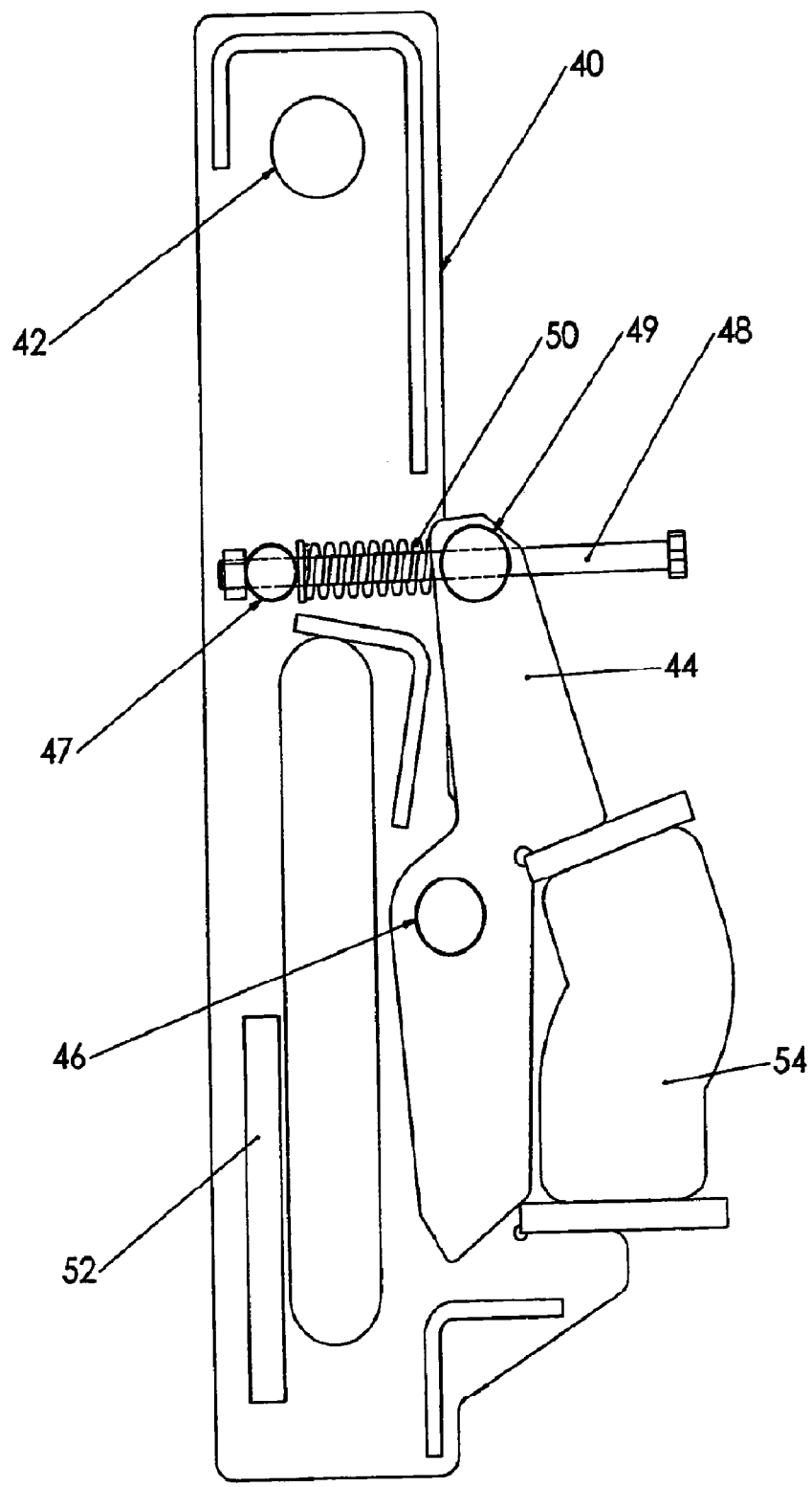

Referring to FIGS. 7A, 7C and 7D, the elements of the post assembly 40 of an embodiment of the present invention are described in detail. The latch assembly 44 is pivotally mounted to post weldment by pin 46. When its operating airbag 54 is vented, it is biased to the closed position (see FIG. 7C) by spring 50 moving on rod 48 which is threaded to pin 47 and is freely axially movable through pin 49. Rotational movement of the latch 44 is stopped when its tip abuts plate 52. When the airbag 54 is inflated, the latch 44 opens by rotating around pin 46 while compressing spring 50 on rod 48 (see FIG. 7D).

Figure 8A:
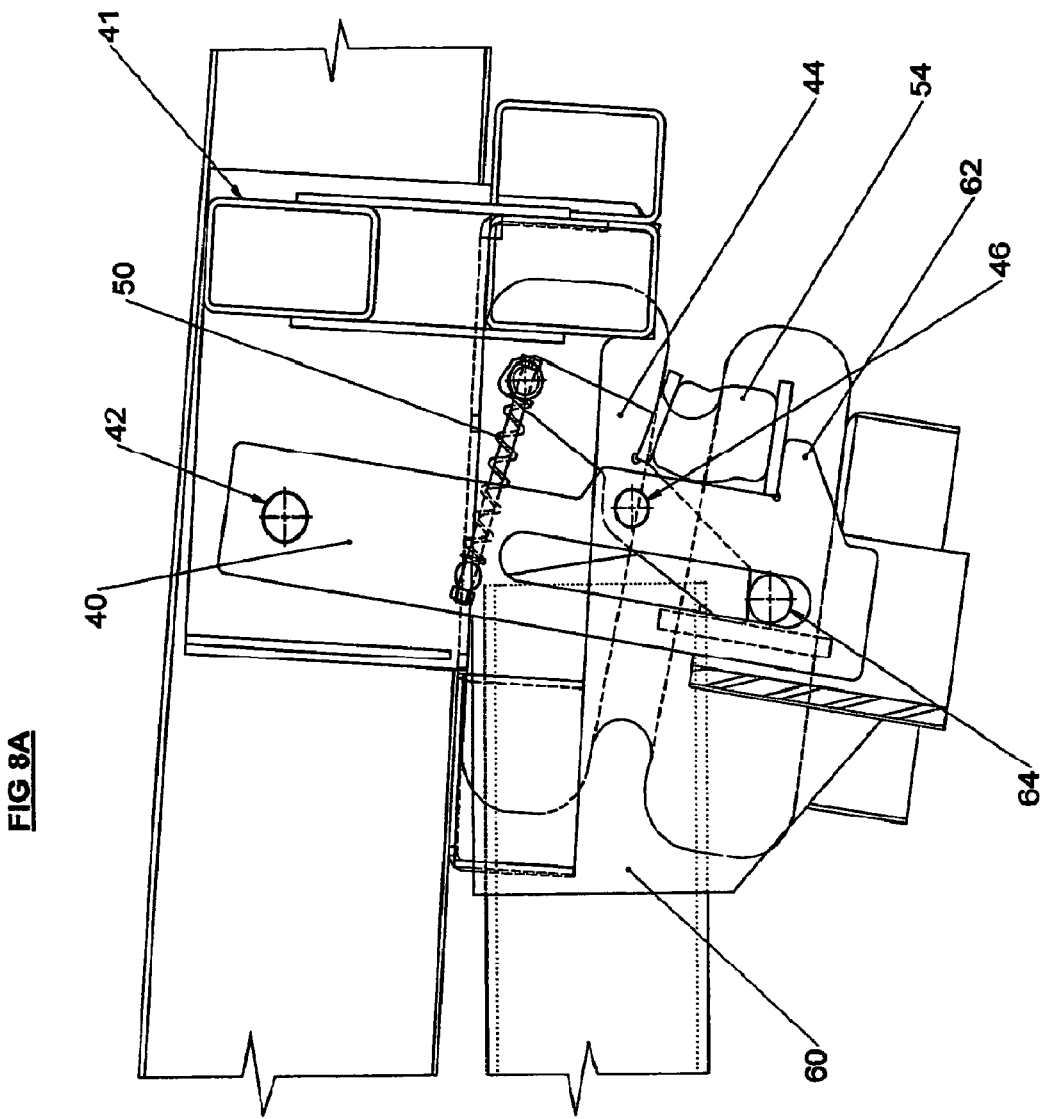
Figure 8C:
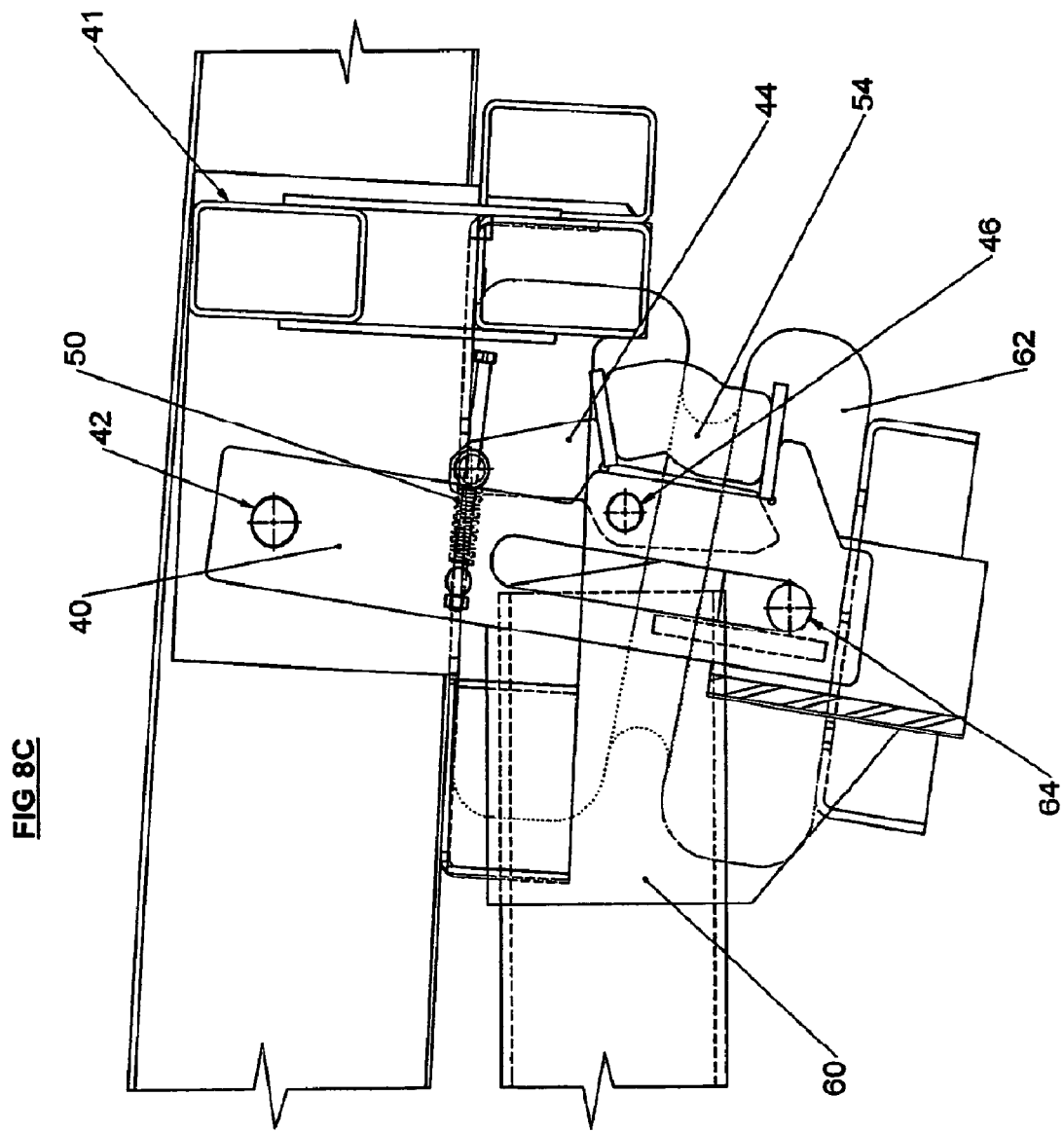
Figure 8D:
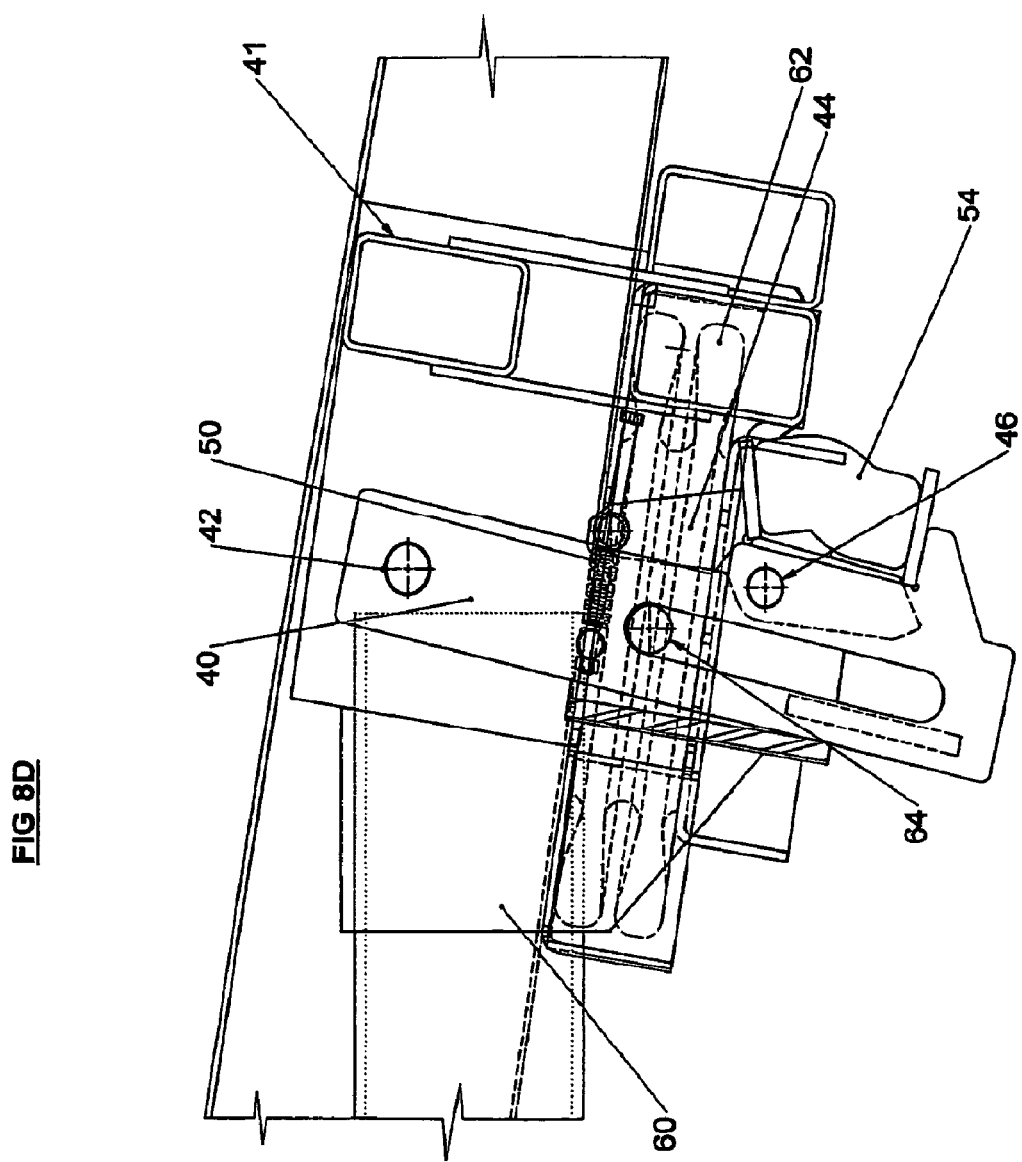

FIGS. 8A through 8D are side views of the two-post assembly 40 together with the truck bed cross frame 41, the truck frame cross beam 60, and the preferred air bag elevating actuator 62. In FIG. 8A, the two-post assembly 40 is shown in the travel position with the bottom face of the latch 44 resting on frame pin 64, and with airbags 54 and 62 vented. In FIG. 8B, airbag 62 is partially inflated thus lifting the deck and the post assemblies 40 so that the bottom face of the latch 44 no longer rests on frame pin 64. In FIG. 8C, airbag 54 has been pressurized causing latch 44 to pivot on pin 46 so that its tip is rotated away from the slot in post assembly 40. In FIG. 8D, airbag 54 remains pressurized while airbag 62 is venting, allowing the rear deck 16 to lower fully. At this point, airbag 54 may be vented allowing latch 44 to close. When elevating the rear deck 16 by pressurizing airbag 62, the post assembly 40 moves upward. When the top face of the latch 44 strikes the bottom side of the frame pin 64, the latch will rotate toward its open position while staying biased against pin 64 due to the compression of spring 50. When the deck has been elevated high enough so that the bottom tip of the latch 44 has cleared the top of pin 64, it will automatically spring shut. At this point, airbag 62 is vented, thus lowering the deck to its traveling position.

A further embodiment of the present invention is directed to a winch system with a winch 70 as shown in FIG. 9A. Such a winch system can be used with the truck bed of the present invention or on other types of vehicles and truck beds and is not limited to the location shown in the figure. In FIG. 9A, the winch system is shown with the winch in a locked position in the center of the bed ready to deploy the winch cable 80 for pulling equipment up the ramps 22, 24 onto the truck bed 12 when the rear deck portion 16 has been lowered and the ramps have been deployed. Handle 72 is shown in horizontal position. As a result, the locking pin 76 (see FIGS. 9D and 9E), which is pivotally attached to handle 72 by cross point 73, is biased down into one of the notches 37 by an internal spring 77 positioned inside tube 78. This biasing action also pulls handle 72 firmly against pins 74 and 75.

Figure 9B:
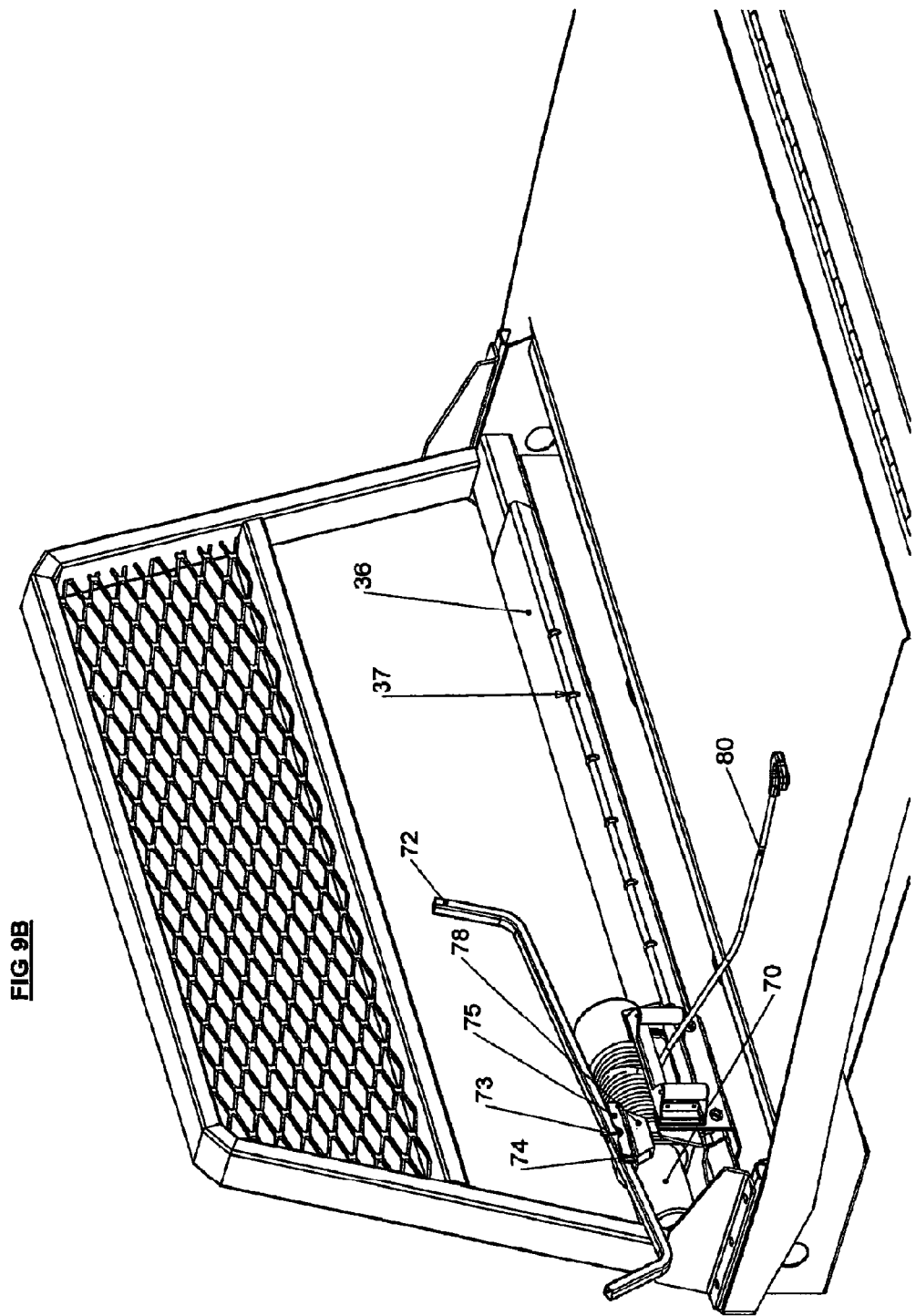
FIG. 9B shows the winch carrier and winch on the left side of the truck bed.

FIG. 9B shows another embodiment of the winch system and winch 70 positioned along the front winch carrier tube 36 to the left of center, and locked in any of the notches 37 to prevent sideways movement while loading equipment. In practice, the handle 72 can be grasped and pulled down so that it rotates around pin 74 thus pulling the locking pin 76 from notch 37 freeing the winch carrier for movement to the left.

FIG. 9C shows another embodiment of the winch system wherein the winch is positioned to the right of center.

FIGS. 9D and 9E show the relationship of the details of the handle 72, cross pin 73, pins 74 and 75, locking pin 76, spring 77, and tube 78.

Figure 10B:
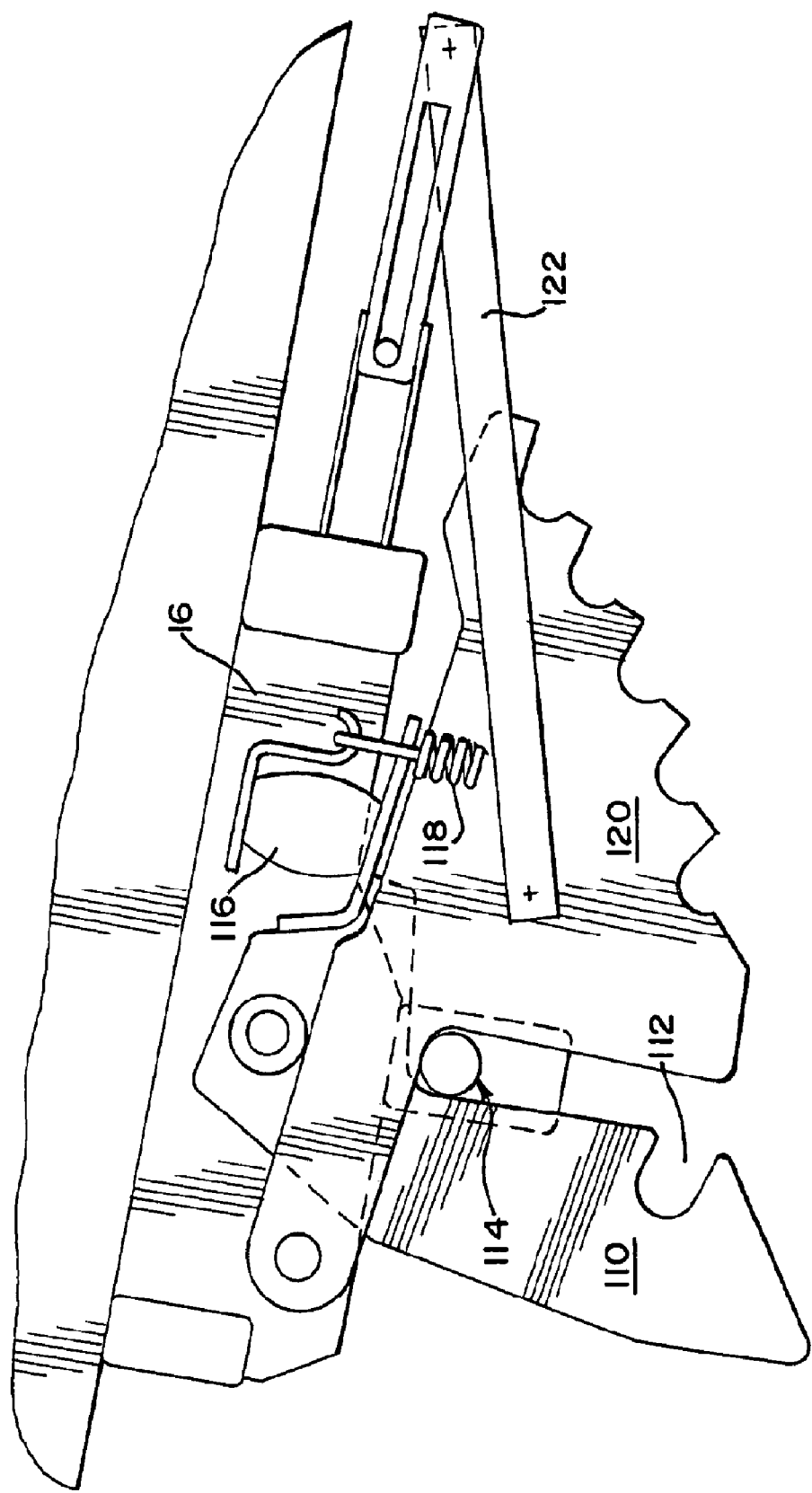
FIG. 10B shows the improved post assembly and dock lock of FIG. 10A with the rear deck of the truck bed in a lowered position.

FIGS. 10A-10C illustrated a further embodiment of the present invention. This embodiment is directed to an improved locking post or post assembly which replaces the post assemblies 40 in the prior embodiments. This embodiment will still include the main airbag 62 (not shown in FIGS. 10A-10C) for raising and lowering the truck bed. One or more of these post assemblies can be located at the rear of a truck.

FIG. 10A illustrates the improved post assembly 110 when the rear deck 16 of the truck bed is in a travel position. Post assembly 110 includes a groove or notch 112 located at the lower end of the locking post. When in the travel position, notch 112 is fit around a locking pin 114 which is attached to the truck frame. An air bag 116 and spring 118 are also shown in FIG. 10A. Post assembly 110 is biased shut on locking pin 114 by spring 118. Further, as shown in FIG. 10B, air bag 116 is used for pushing post assembly 110 away from locking pin 114 when it is desired to lower the rear deck, e.g. for unloading or loading something onto the truck bed. Dock lock 120 is shown in the stored position in this figure.

FIG. 10B illustrates the post assembly of FIG. 10A when the rear deck 16 is in the lowered position. In this position, air bag 116 causes post assembly 110 to swing away from locking pin 114 to free the rear deck so it can be lowered. Locking pin 114 then moves out of notch 112 and slides upward as deck 16 is lowered. As shown in FIG. 10B, dock lock 120 is held in place by a spring biased linkage 122

FIG. 10C illustrates the rear deck 16 being raised to height for loading or unloading from a commercial truck dock. To elevate the deck, post assembly 110 is swung loose from locking pin 114 in the same manner as described above for FIG. 10B. The main airbag (62 in prior figures) is further inflated causing rear deck 16 to rotate upward. Linkage 122 holding dock lock 120 is released, allowing dock lock 120 to rotate down against locking pin 114. In practice, preferably rear deck 16 is rotated upward until its rear edge is slightly above the level of the dock. Pressure in the main airbag is released, allowing the appropriate notch 124 to engage locking pin 114, and thus firmly holding the rear deck at or near dock height, in a ready position for loading or unloading the truck. To return the rear deck from dock height to a travel position, the main airbag is inflated enough to free dock lock 120 from locking pin 114. Dock lock 120 is then rotated into travel position by linkage 122. The main airbag is vented allowing the rear deck to rotate downward. The angled surface of post assembly 110 below notch 112 encounters locking pin 114, causing the locking post to swing back under spring pressure. As notch 112 comes in line with locking pin 114, post assembly 110 swings shut under spring pressure, thus locking the rear deck in its travel position.

This description has been offered for illustrative purposes only and is not intended to limit the invention of this application which is defined in the claims below.

I claim:

1. A vehicle or equipment transport vehicle comprising:
   (a) a plurality of spaced apart and generally coaxial rearward-most located wheels overlying a traveling surface;
   (b) a bed comprising an elongate deck having an outer equipment or vehicle supporting surface with at least a portion of the deck being displaceable relative to the traveling surface between (1) an equipment or vehicle transport position where equipment or vehicle loaded onto the deck is transportable with the deck spaced a first distance from the travelling surface, and (2) an equipment or vehicle loading facilitating position with the deck spaced a second distance from the travelling surface that is closer to the travelling surface than when in the transport position;
   (c) a first deck displacement drive that displaces the deck toward one of the transport and loading facilitating positions;
   wherein part of the deck overlies the rearward-most located wheels and wherein the deck displacement drive cooperates with the deck in displacing the displaceable deck portion without substantial translation between the transport position and the loading facilitating position such that deck displacement toward the transport position moves the wheel-overlying part of the deck away from the wheels, and deck displacement toward the loading facilitating position moves the wheel-overlying part of the deck toward the wheels; and wherein the deck comprises a rounded or angled section located where it prevents vehicle bottoming on the deck during vehicle loading when the deck is disposed in the loading position.

2. The transport vehicle of claim 1 wherein the elongate deck comprises a plurality of deck sections with one of the deck sections being pivotable relative to another one of the deck sections and further comprising a second deck displacement drive configured to rotate the pivotable deck section between an equipment or vehicle loading position and an upraised equipment or vehicle transport position.

3. The transport vehicle of claim 1 wherein the transport vehicle comprises a truck and the bed comprises a truck bed.

4. A vehicle or equipment transport vehicle comprising:
(a) a plurality of spaced apart and generally coaxial wheels overlying a traveling surface;
(b) a bed overlying and extending beyond the wheels and comprising an elongate deck having an outer equipment or vehicle supporting surface with a portion of the deck being displaceable relative to the traveling surface between (1) an equipment or vehicle transport position for equipment or vehicle transport where the deck is spaced a first distance from the traveling surface, and (2) an equipment or vehicle loading position where the deck is spaced a second distance from the traveling surface that is closer to the traveling surface than when located in the transport position;
(c) a deck displacement drive in operable cooperation with the deck for displacing the displaceable deck portion toward one of the transport and loading positions with displacement including rotational displacement without substantial translation between the transport position and the loading deck;
wherein the deck comprises an angled deck section where one part of the outer equipment or vehicle supporting surface of the angled deck section is angled relative to another part of the outer equipment or vehicle supporting surface of the angled deck section with the angled deck section being angled where it prevents vehicle bottoming on the deck during vehicle loading when the displaceable deck portion is located in the loading position;
a fixed rotary joint operatively connected to the displaceable deck portion enabling rotation of the displaceable deck portion but opposing substantial translation of the displaceable deck portion by preventing the displaceable deck portion from moving in a direction away from the rotary joint during rotation of the displaceable deck portion;
a transport vehicle frame and wherein the fixed rotary joint comprises a pivot grounded to the frame; and
wherein (i) the deck is comprised of a plurality of deck segments with one of the deck segments fixed to the transport vehicle frame and another one of the deck segments being located rearwardly of the one of the deck segments and comprising the displaceable deck portion, and (ii) the pivot has an axis of rotation extending transversely relative to a lengthwise direction of the bed.

5. The transport vehicle of claim 4 wherein the displaceable deck portion comprises the angled deck section.

6. The transport vehicle of claim 4 wherein the angle of the angled deck section comprises a convexly curved portion extending in a lengthwise direction relative to the deck.

7. The transport vehicle of claim 6 wherein the convexly curved portion comprises a continuous convex curve shape.

8. The transport vehicle of claim 4 wherein the transport vehicle comprises a truck.

9. The transport vehicle of claim 4 wherein the pivot comprises an elongate hinge that extends generally transversely relative to a lengthwise direction of the bed.

10. A vehicle or equipment transport vehicle comprising:
(a) a plurality of pairs of wheels overlying a travelling surface;
(b) an elongate vehicle or equipment supporting displaceable bed that is movable between an upright position and a partially lowered position where the displaceable bed is closer to the travelling surface than when in the upright position, wherein the displaceable bed includes a front deck section hinged to a pivotable rear deck section that is pivotable between a transport position and a vehicle or equipment loading position without substantial translation away from the front deck section such that the pivotable rear deck section is closer to the travelling surface than when in the loading position;
(c) a first deck displacement drive in operable cooperation with the displaceable bed that is configured to move the displaceable bed between the upright position and the partially lowered position;
(d) a second deck displacement drive in operable cooperation with the pivotable rear deck section that is configured to pivot the pivotable rear deck section wherein the second deck displacement drive comprises a drive actuator disposed in operable cooperation with the pivotable rear deck section and being capable of displacing the pivotable rear deck section when actuated; and
(e) at least one ramp extending from the pivotable rear deck section toward the travelling surface.

11. The transport vehicle of claim 10 wherein the second deck displacement drive further comprises a latch arrangement having a deck-locking position enabling releasable locking of the pivotable rear deck section in the transport position preventing pivotal displacement of the pivotable rear deck section away from the transport position when the latch arrangement is locked and wherein the latch arrangement comprises (i) a movable latch that is movable between a releasable latched position capable of locking the pivotable rear deck section and an unlatched position enabling displacement of the pivotable rear deck section, and (ii) a latch actuator that cooperates with the movable latch to move the latch when the latch actuator is actuated.

12. The transport vehicle of claim 11 wherein the movable latch comprises an elongate post that is operably pivotally connected to the pivotable rear deck section and movable between the releasable latched position where it is capable of locking the pivotable rear deck section in the transport position and the unlatched position where it enables the pivotable rear deck section to be displaced by the drive actuator to a position that is located away from the transport position.

13. The transport vehicle of claim 12 further comprising a transport vehicle frame underlying the deck and wherein the elongate post comprises a seat in which part of the frame is receivable when the pivotable rear deck section is located in the transport position and the elongate post is located in the releasable latched position.

14. The transport vehicle of claim 10 further comprising a transport vehicle frame underlying the deck and wherein the drive actuator of the second deck displacement drive comprises a fluid driven actuator located between the frame and the pivotable rear deck section.

15. The transport vehicle of claim 14 wherein the fluid driven actuator comprises a pneumatic actuator.

16. The transport vehicle of claim 10 wherein at least one of the front deck section and the pivotable rear deck section includes a convexly curved or convexly angled portion located to prevent vehicle bottoming when the pivotable rear deck section is located in the vehicle or equipment loading position.

17. A vehicle or equipment transport vehicle comprising:
(a) a plurality of pairs of wheels overlying a travelling surface;
(b) an elongate vehicle or equipment supporting bed overlying the wheels that comprises a displaceable deck movable between a fully upright position and a partially lowered position where the displaceable deck is closer to the travelling surface than when in the fully upright position;
(c) a pivot and wherein (i) the deck comprises a plurality of deck segments with one of the deck segments being located rearwardly of another one of the deck segments, being in operable cooperation with the pivot, and being pivotable without translational displacement between a transport position and a loading position, (ii) the rearwardly located deck segment comprises a convexly curved section of the outer equipment or vehicle supporting surface of the rearwardly located deck segment that is located adjacent the pivot, and (iii) the rearwardly located deck segment forms at least a portion of a drive-up loading ramp when disposed in the loading position;
(d) a fluid-powered deck displacement drive in operable cooperation with the rearwardly located deck segment that is configured to displace the rearwardly located deck segment toward one of the transport and loading positions; and
(e) at least one ramp disposed rearwardly of the rearwardly located deck segment.

18. The transport vehicle of claim 17 further comprising an elongate transport vehicle frame in operable communication with the deck, the deck displacement drive, and the wheels, and wherein the deck displacement drive comprises a transport vehicle frame-mounted deck elevating device that cooperates with the transport vehicle frame and the rearwardly located deck segment enabling displacement of the rearwardly located deck segment relative to the transport vehicle frame.

19. The transport vehicle of claim 18 further comprising a latch assembly constructed and arranged to releasably retain the rearwardly located deck segment in a predetermined position when latched.

20. The transport vehicle of claim 19 wherein the latch assembly comprises a latch actuator in operable cooperation with a latch lever urging the latch lever when actuated toward an unlatched position enabling displacement of the rearwardly located deck segment by the deck elevating device.

21. A vehicle or equipment transport vehicle comprising:
(a) an elongate transport vehicle frame;
(b) a plurality of wheels carrying the transport vehicle frame;
(c) an elongate bed supported by the transport vehicle frame that is comprised of a displaceable deck that is displaceable between an upright position and a partially lowered loading facilitating position with the displaceable deck comprising a rearward-most deck section connected to a pivot enabling displacement of the rearward-most deck section between a vehicle or equipment loading position and a vehicle or equipment transport position above the vehicle or equipment loading position;
(d) a first deck displacement drive underlying the deck and carried by the transport vehicle frame enabling deck displacement when actuated;
(e) a second deck displacement drive assembly underlying the deck and carried by the transport vehicle frame enabling displacement of the rearward-most deck section when actuated;
wherein the rearward-most deck section is displaced to the vehicle equipment or loading position when the displaceable deck is disposed in the partially lowered loading facilitating position; and
wherein the displaceable deck, including the rearward-most deck section, forms an outer equipment or vehicle supporting deck surface and comprising an angled section when the rearward-most deck section is disposed in the vehicle or loading position where one part of the outer equipment or vehicle supporting deck surface is angled relative to another part of the outer equipment of vehicle supporting deck surface with the angled section being located where it prevents vehicle bottoming on the deck during vehicle loading when the rearward-most deck section is disposed in the loading position.

22. The transport vehicle of claim 21 wherein the pivot has an axis of rotation about which displacement of the rearward-most deck section is enabled that is generally transverse to a lengthwise extent of the bed and wherein the pivot is grounded to the frame permitting rotational displacement of the rearward-most deck section while preventing translational displacement of the rearward-most deck section in a direction away from the axis of rotation of the pivot.

23. The transport vehicle of claim 22 wherein the angled section of the outer equipment or vehicle supporting deck surface comprises a curved section of the outer equipment or vehicle supporting deck surface extending along a lengthwise extent of the outer equipment or vehicle supporting deck surface that has a radius of curvature extending downwardly toward a vehicle travelling surface upon which the wheels are supported.

24. The transport vehicle of claim 23 wherein the curved section of the outer equipment or vehicle supporting deck surface is formed by a convexly rounded or convexly curved portion of the rearward-most deck section.

25. The transport vehicle of claim 24 wherein the convexly rounded or convexly curved portion of the rearward-most deck section is continuously convexly rounded or continuously convexly curved.

26. The transport vehicle of claim 21 further comprising a latch assembly in operable cooperation with the deck that releasably retains the deck in the vehicle or equipment transport position and wherein (i) the transport vehicle frame is comprised of a plurality of longitudinally extending, spaced apart and generally parallel frame rails underlying the deck with one of the frame rails extending along and adjacent one side of the deck and the other one of the frame rails being extending along and adjacent the other side of the deck, (ii) the deck displacement drive assembly further comprises a plurality of deck position latching post assemblies with one of the deck position latching post assemblies operably connected to the deck and frame adjacent one of the frame rails and the other one of the deck position latching post assemblies operably connected to the deck and frame adjacent the other one of the frame rails, and (iii) the deck elevating device comprises a fluid powered drive actuator that is located between the deck position latching post assemblies.

27. The transport vehicle of claim 26 wherein each one of the deck position latching post assemblies comprises an elongate locking post that is pivotally connected at or adjacent one end to the deck and that is configured to interfere with relative movement between the locking post and an adjacent part of the frame to releasably lock the deck in a vehicle or equipment transport position located above the vehicle loading position.

28. The transport vehicle of claim 27 further comprising a latch actuator in operable cooperation with each one of the deck position latching post assemblies that urges a corresponding one of the locking posts away from a relative movement interfering deck locking position permitting deck displacement to occur and wherein the first deck displacement drive comprises a suspension arrangement.

29. The transport vehicle of claim 21 wherein the angled section is formed by one of the displaceable deck and rearward-most deck section at or adjacent the pivot.

* * * * *

UNITED STATES PATENT AND TRADEMARK OFFICE
CERTIFICATE OF CORRECTION

| | | |
|---|---|---|
| PATENT NO. | : 7,503,742 B2 | Page 1 of 1 |
| APPLICATION NO. | : 11/451025 | |
| DATED | : March 17, 2009 | |
| INVENTOR(S) | : Raymond Smith, Jr. | |

It is certified that error appears in the above-identified patent and that said Letters Patent is hereby corrected as shown below:

IN THE CLAIMS

Column 10, line 19, delete "yehicle" and substitute therefore -- vehicle --.

Signed and Sealed this

Sixteenth Day of March, 2010

David J. Kappos
*Director of the United States Patent and Trademark Office*